United States Patent
Cope et al.

(10) Patent No.: US 6,536,953 B1
(45) Date of Patent: Mar. 25, 2003

(54) BEARING MOUNT SYSTEM FOR REDUCING VIBRATION

(75) Inventors: Steven A. Cope, Hockessin, DE (US); Jeffrey L. Kennard, Hockessin, DE (US); Mark A. Lamontia, Landenberg, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 34 days.

(21) Appl. No.: 09/709,777

(22) Filed: Nov. 8, 2000

(51) Int. Cl.$^7$ .............................................. F16C 27/06
(52) U.S. Cl. ...................................... 384/536
(58) Field of Search ............................ 384/535, 536, 384/581, 582

(56) References Cited

U.S. PATENT DOCUMENTS

| | | | |
|---|---|---|---|
| 2,244,197 A | | 6/1941 | Hessler |
| 3,301,612 A | * | 1/1967 | Thomas ...................... 384/536 |
| 4,941,757 A | | 7/1990 | Hall |
| 5,033,875 A | * | 7/1991 | Moulinet ..................... 384/582 |
| 5,247,855 A | * | 9/1993 | Alten et al. ................. 384/536 |
| 5,295,744 A | | 3/1994 | Petrzelka et al. |
| 5,463,861 A | * | 11/1995 | Lorenz ........................ 384/536 |
| 5,816,712 A | * | 10/1998 | Brown et al. ............... 384/582 |

FOREIGN PATENT DOCUMENTS

WO  WO99/60282 A1  11/1999

OTHER PUBLICATIONS

Fafnir Ball Bearings, The Most Complete Line in America, Catalog 68, First Edition, First Printing, 1967, p. 189, The Fafnir Bearing Company, General Offices—New Britain Connecticut, 06050, Printed in USA.

* cited by examiner

Primary Examiner—Thomas R. Hannon

(57) ABSTRACT

A bearing mounting system and method that reduces vibration using a singular annular elastomeric member contained in a substantially enclosed area that includes open area free of elastomeric material. A bearing raceway surface and an adjacent support surface are spaced apart by a predetermined radial gap. The enclosed cross-sectional area is bounded by features on the bearing raceway surface and the supporting surface that could be either the rotating roll or a support shaft. The enclosed area has a depth and a width and includes the radial gap. The viscoelastic deformation of the elastomeric member contained in this enclosed area in conjunction with the amount of open area in the enclosed area, provides a dual stiffness system that reduces or eliminates the excessive vibration that occurs in chucks for textile fiber windups or similar systems, when there is relative movement to reduce the radial gap and the enclosed area containing the radial gap.

36 Claims, 18 Drawing Sheets

BEARING MOUNT SYSTEM FOR REDUCING VIBRATION

FIELD OF THE INVENTION

The invention relates reduction of vibration, and more particularly concerns a method and apparatus using a bearing mount system for reducing the vibration.

BACKGROUND OF THE INVENTION

Presently, a problem occurs with rotating rolls that operate near their natural frequency of vibration in that the vibration becomes excessive and the rolls do not run smoothly. In the textile fibers industry, this problem is of particular concern with a chuck for a textile fibers windup when the chuck is driven by contact with a drive roll contacting a package mounted on the chuck. As the package size increases, the speed of the chuck continuously decreases increasing the likelihood of encountering a natural frequency speed. In such a case, excessive vibration causes defects in the package as it "bounces" against the drive roll in its rotation. Some of these defects result in roundness and differences in package density or stiffness nonuniformity resulting in a package having mass unbalance further accentuating the problems of vibration.

For instance, in a plant facility where it was desired to make heavy denier packages on a windup having, for example, four chucks, the polymer delivery system could not deliver enough polymer to operate at full speed for the windup. The windup was then operated at less than full speed to accommodate the polymer supply, however, a natural frequency of the chuck was encountered, especially near the final package size, resulting in severe chuck vibration. Unfortunately, it was not possible to wind packages on the four chucks at the lowered speed. The force between the chuck and the drive roll affects this natural frequency, in that the frequency increases slightly with higher chuck forces. Generally, for good package formation and less machine wear, it is desirable to run with lower chuck forces. Operating only two of the four chucks (on one side of the winder) and running at a higher speed solved the vibrational problem, but productivity suffered. It is desired to find a way to reduce vibrations in chucks or similar rotating rolls without loss of productivity. It is also desired to reduce vibrations to make possible operation at lower speed on the chucks and at a lower chuck force.

The following disclosures may be relevant to various aspects of the present invention and are briefly summarized as follows: The Fafnir Bearing Company (now a division of the Torrington Co.) in a 1967 catalog (Catalog 68) offered a number of quiet bearing designs to reduce noise and vibration of standard ball bearings. On page 189 of the catalog, one design provided a U-shaped conductive rubber interliner that fit between the outer race and a pressed steel pillow block housing. The outer portions of elastomer were not contained and no design was offered for the inner race.

U.S. Pat. No. 2,244,197 shows a ball or roller bearing having a vulcanized rubber support for the inner race and for the outer race to reduce sound and vibration. The rubber supports may be vulcanized to their bed or pressed into it and they may be partially contained by shoulders on shafts or housings.

U.S. Pat. No. 5,295,744 shows a ball bearing for a drive shaft which has the inner race mounted to the shaft with a resilient means which in one embodiment comprises a double walled resilient annular member that may be filled with a settable elastomer or a damping fluid (FIG. 3). In another embodiment (FIG. 4), the support for the inner race is a resilient annular web that form-fittingly engages spaced O-rings, which help dampen vibration from the shaft. The elastomer is not rigidly contained axially.

U.S. Pat. No. 5,816,712 shows spaced elastomer rings sandwiched between metal cylinders that serves as a vibration attenuating mounting for the inner race of a ball bearing; a similar arrangement is also provided for the outer race. The spaced elastomer elements for the inner race are constrained axially by metal backing plates that have additional elastomer disks that axially engage the inner race.

SUMMARY OF INVENTION

Briefly stated, and in accordance with one aspect of the present invention, there is provided a mounting system for a rotary bearing having an inner raceway and an outer raceway, each having a mounting surface, used to support a rotating roll on a stationary support member, comprises: an annular groove adjacent the mounting surface of a raceway on the bearing, the raceway having shoulders on each end of the surface and the groove having a bottom with ends that are substantially aligned with the shoulders of the raceway and a land defining the top of the groove, with the land radially spaced from the raceway by a predetermined radial gap; a substantially enclosed cross-sectional area when the raceway mounting surface is concentric with the groove, the enclosed area defined by the groove bottom on one side, the raceway surface on an opposed side, and the groove ends, with the extension of the groove ends intersecting the raceway surface or an extension thereof at the gap, on the end sides; a singular annular member comprising an elastomer, the singular member mounted in the groove and contacting the bottom of the groove and the surface of the raceway, the singular member having a cross-sectional area that is contained within the enclosed cross-sectional area; an open area within the enclosed cross-sectional area that is free of singular member elastomer, the open area being 15% to 100% of a gap area comprising the product of the distance between the groove ends and the gap, so that when there is relative movement to reduce the distance between the surface of the raceway and the groove land which deflects the singular member elastomer and reduces the enclosed area, the open area is reduced or eliminated and the singular member elastomer viscoelastically deforms so that the mounting system provides a first rate of stiffness during the initial movement and a second rate of stiffness as the movement continues and before the radial deflection exceeds the radial gap, the second stiffness greater than the first stiffness.

Pursuant to another aspect of the present invention, a method for reducing the vibration of a rotating roll supported by a rotary bearing on a stationary support member, the bearing having an inner raceway and an outer raceway, each having a mounting surface, comprising: aligning a mounting surface of a raceway on the bearing adjacent an annular groove, the raceway having shoulders on each end of the surface and the groove having a bottom with ends that are substantially aligned with the shoulders of the raceway and a land defining the top of the groove, with the land radially spaced from the raceway by a predetermined radial gap; arranging the bearing surface concentric with the groove to define a substantially enclosed cross-sectional area, the enclosed area defined by the groove bottom on one side, the raceway surface on an opposed side, and the groove ends, with the extension of the groove ends intersecting the raceway surface or an extension thereof at the gap, on the end sides; partially filling the enclosed cross-sectional area with an elastomer material that contacts the bottom of the groove and the raceway surface; providing an open area within the enclosed cross-sectional area that is free of elastomer, the open area being less than or equal to a gap area comprising the product of the distance between the groove ends and the gap; resisting initial relative movement to reduce the distance between the surface of the raceway and the groove land by viscoelastic deformation of the elastomer material at least partially into the open area providing a first stiffness for reducing vibration, and resisting the relative movement during subsequent movement, before closing the radial gap, by viscoelastic deformation of the elastomer providing a second stiffness for reducing vibration, the second stiffness greater than the first stiffness.

Pursuant to another aspect of the present invention, a mounting system for a rotary bearing a rotary bearing having an inner raceway and an outer raceway, used to support a rotating roll on a stationary support member, comprises: an annular groove, contained in a raceway on the bearing, adjacent a load bearing surface, the annular groove having a bottom with ends opposite one another, the ends being inside a structurally effective width of the raceway, and the groove having a land defining the top of the groove with the land radially spaced from the load bearing surface by a predetermined radial gap; a substantially enclosed cross-sectional area when the bearing surface is concentric with the groove, the enclosed area defined by the groove bottom on one side, the load bearing surface on an opposed side, and the groove ends, with the extension of the groove ends intersecting the load bearing surface at the gap, on the end sides; a singular annular member comprising an elastomer, the singular member mounted in the groove and contacting the bottom of the groove and the load bearing surface, the singular member having a cross-sectional area that is contained within the enclosed cross-sectional area; an open area within the enclosed cross-sectional area that is free of singular member elastomer, the open area being 15% to 100% of a gap area comprising the product of the distance between the groove ends and the gap, so that when the load bearing surface and the land move relatively toward one another deflecting the singular member elastomer and reducing the enclosed area, the open area is reduced or eliminated and the singular member elastomer viscoelastically deforms so that the mounting system provides a first rate of stiffness during the initial deflection and a second rate of stiffness as the deflection continues and before the radial deflection exceeds the radial gap, the second stiffness greater than the first stiffness.

Pursuant to another aspect of the present invention, there is provided a method A method for reducing the vibration of a rotating roll supported by a rotary bearing on a stationary support member, the bearing having an inner raceway and an outer raceway, comprising: aligning an annular groove, contained in a raceway on the bearing, adjacent a load bearing surface, the annular groove having a bottom with ends opposite one another, the ends being inside a structurally effective width of the raceway and a land defining the top of the groove with the land radially spaced from the load bearing surface by a predetermined radial gap; arranging the annular groove concentric with the load bearing surface to define a substantially enclosed cross-sectional area, the enclosed area defined by the groove bottom on one side, the load bearing surface on an opposed side, and the groove ends, with the extension of the groove ends intersecting the load bearing surface at the gap, on the end sides; partially filling the enclosed cross-sectional area with an elastomer material that contacts the bottom of the groove and the load bearing surface; providing an open area within the enclosed cross-sectional area that is free of elastomer, the open area being less than or equal to a gap area comprising the product of the distance between the groove ends and the gap; resisting initial relative movement to reduce the distance between the groove land and the load bearing surface by viscoelastic deformation of the elastomer material at least partially into the open area providing a first stiffness for reducing vibration, and resisting the relative movement during subsequent movement, before closing the radial gap, by viscoelastic deformation of the elastomer providing a second stiffness for reducing vibration, the second stiffness greater than the first stiffness.

Pursuant to another aspect of the present invention, there is provided A mounting system for a rotary bearing having an inner raceway and an outer raceway, each having a mounting surface, used to support a rotating roll on a stationary support member, comprises: a predetermined radial gap spacing apart the raceway mounting surface and an adjacent support surface when the raceway mounting surface is concentric with the support surface; a substantially enclosed cross-sectional area having a top and bottom defined by features on the raceway mounting surface and the adjacent support surface thereby defining an enclosed area depth, the enclosed area having a width and the enclosed area including the radial gap; a singular annular member comprising an elastomer, the singular member mounted in the enclosed area and contacting the bottom and top of the enclosed area, the singular member having a cross-sectional area that is contained within the enclosed cross-sectional area; and an open area within the enclosed cross-sectional area that is free of the elastomer of the singular member.

BRIEF DESCRIPTION OF THE DRAWINGS

Other features of the present invention will become apparent as the following description proceeds and upon reference to the drawings, in which:

FIG. 12A shows a further embodiment of the present invention while

FIG. 13A shows a further embodiment of the present invention while

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Reference is now made to the drawings where the showings are for the purpose of illustrating a preferred embodiment of the invention and not for limiting same.

Figure 1:
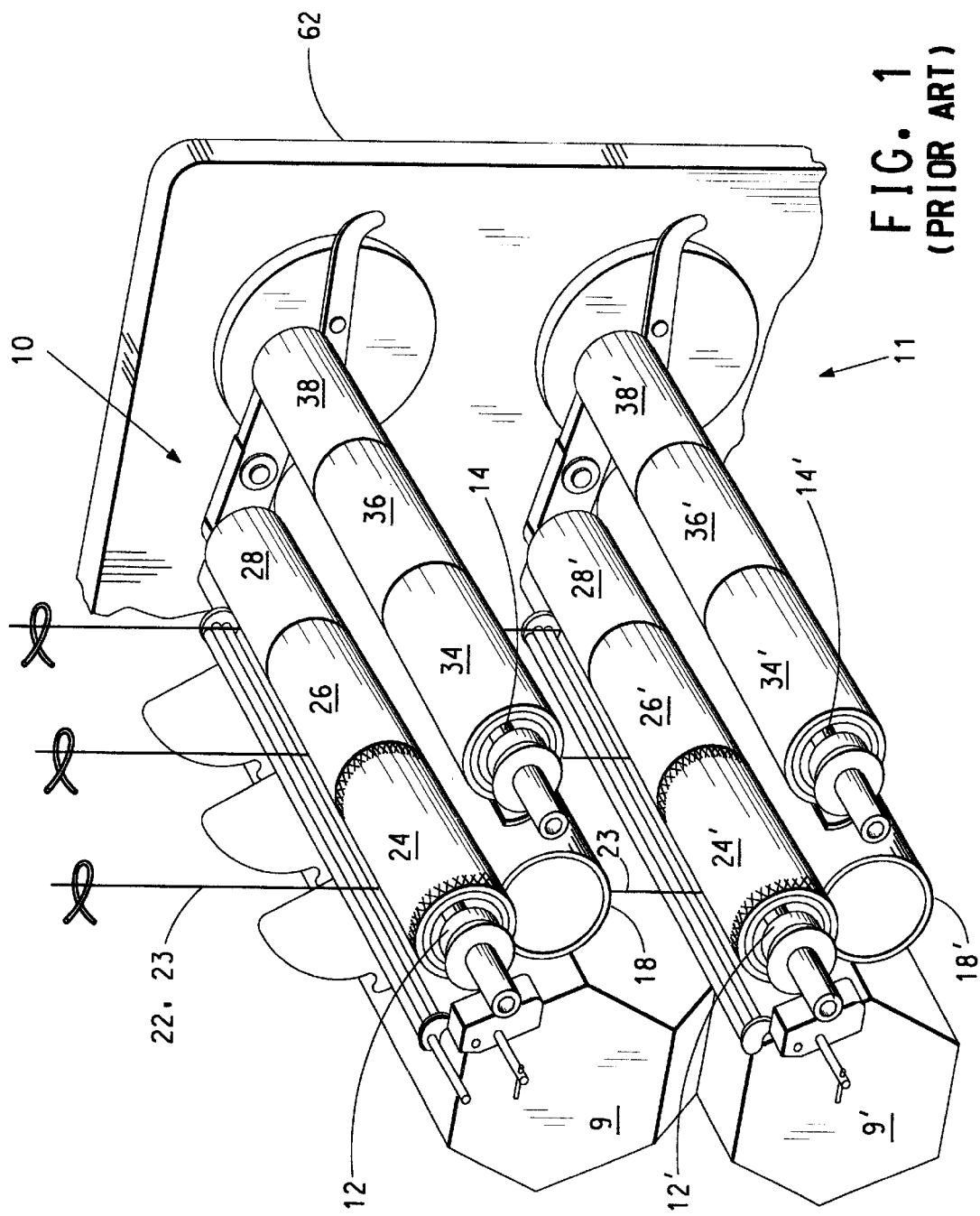
FIG. 1 is an isometric view of a typical prior art windup.

FIG. 1 shows an isometric view of a the right half side of a typical prior art windup 10 which has a support frame 62, a drive roll 18 cantilevered from the frame, package support chucks 12 and 14 for engagement with drive roll 18 and a yarn traversing mechanism 9. This windup also has a second drive roll 18', support chucks 12' and 14' and traversing mechanism 9'. The left side of the windup would be similarly configured. Chuck 12 is shown with winding packages 24, 26, and 28 engaged with drive roll 18; and empty tube cores 34, 36, and 38 waiting for engagement with drive roll 18 after the packages 24, 26, and 28 reach full size. Chuck 12' is shown with winding packages 24', 26', and 28' engaged with drive roll 18'; and empty tube cores 34', 36', and 38' waiting for engagement with drive roll 18' after the packages 24', 26', and 28' reach full size. Yarn line 22 is guided by traverse mechanism 9 to package 24 and yarn line 23 is guided by traverse mechanism 9' to package 24'. Other yarn lines are similarly guided to the other packages on chucks 12 and 12'.

Figure 2:
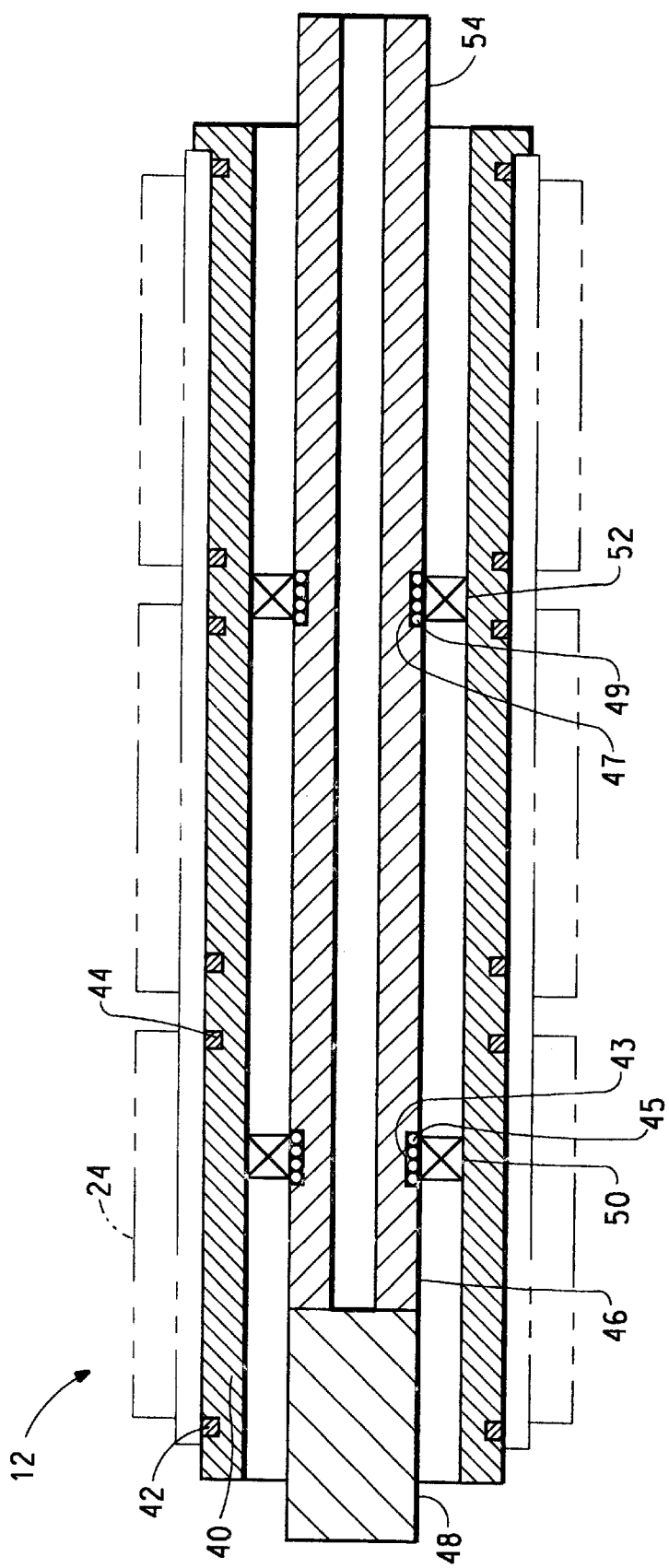
FIG. 2 is a schematic sectional view of a chuck from a prior art windup.

Reference is now made to FIG. 2 which shows a simplified section view of a typical prior art chuck 12 which comprises a roll shell 40 with package gripping rings, such as rings 42 and 44 for package 24, a support shaft 46 with a control device 48, and a front support bearing 50 and a rear support bearing 52. The end 54, of support shaft 46, is supported by a chuck mounting arrangement on the windup 10. The shaft 46, has a first groove 43 under bearing 50 that contains several O-rings 45. Shaft 46 has a second groove 47 under bearing 52 that contains several O-rings 49. Conventional bearing retaining means, such as springs, elastomers, clamps, shoulders and the like, are used to retain the bearings axially in position relative to the shaft 46 and roll shell 40.

Initially, an effort to reduce vibration by mounting the bearings for the chuck on a resilient surface that can control the vibrations was tried. In the four chuck winder example described above, a groove was placed on the supporting shaft and the groove was filled with several (typically five) O-rings. The bearing on the chuck sleeve was slipped over the O-rings so the O-rings supported the inner race of the bearing. The depth of the groove was such that the O-rings were compressed slightly and securely retained by the groove. The O-rings were typically Viton™ with a durometer of 70–90 units on the Shore A hardness scale. Another O-ring that was tried was a white silicone elastomer with a durometer of 40 Shore A. The chuck vibration using the higher durometer O-rings was excessive and unacceptable. The chuck vibration using the lower durometer O-rings improved, but after a short period of operation, the individual low durometer O-rings worked out of the groove and winding on the chuck had to be stopped.

Figure 3:
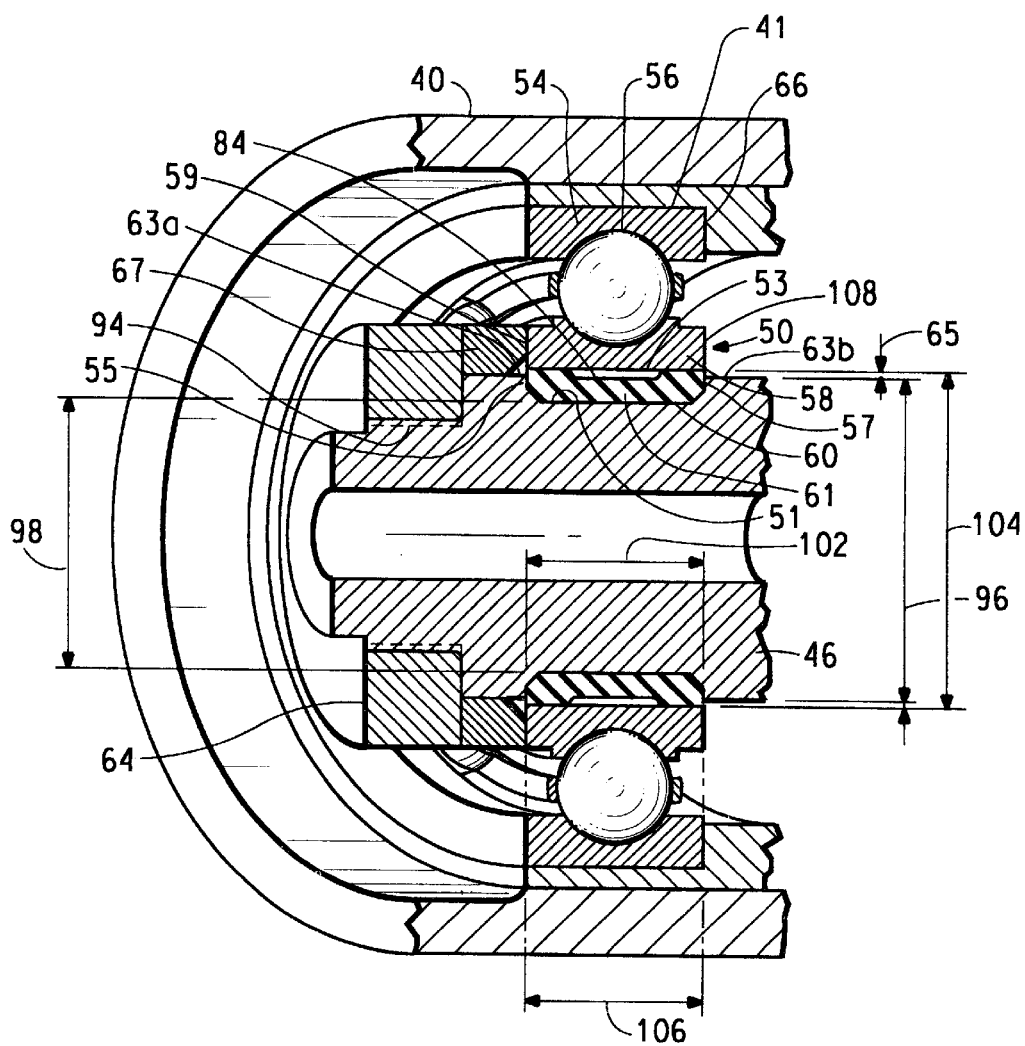
FIG. 3 is an isometric section view of a bearing on a chuck that has an annular elastomeric member of the present invention in a groove on a support member and contacting the inner race of the bearing.

FIG. 3 is an enlarged perspective view of an improved bearing mounting for the chuck 12 of FIG. 2 showing a detailed view of the front bearing 50. Bearing 50 has a rotating outer raceway 54 with a mounting surface 41 that is rigidly seated in an annular recess 56 of roll shell 40, and an inner raceway 58 with a mounting surface 53 that is resiliently seated in substantial alignment with an annular groove 60 contained by the stationary support member, such as shaft 46. A singular annular resilient member 61 comprising an elastomer rests in contact with the bottom 51 of groove 60 and contacts the surface 53 of inner raceway 58. By elastomer is meant: (1) any of various polymers having the elastic properties of natural rubber; and/or (2) a material, such as synthetic rubber or plastic, which at room temperature can be stretched under low stress to about twice its original length or more and, upon immediate release of the stress, will return with force to its approximate original length.

With continuing reference to FIG. 3, the groove 60 has ends 55 and 57 that are axially aligned with shoulders 59 and 108 on inner raceway 58. The groove has a land 63a and 63b that defines the top of the groove. The land 63a and 63b is radially spaced from the raceway surface 53 by a predetermined radial gap 65 when the bearing surface 53 is concentric with the groove 60 and especially with groove land 63a and 63b. A retainer 64 threadedly mounted on shaft 46 presses ring 67 against bearing inner raceway 58 to hold the bearing in place and resists axial movement of the bearing 50 to the left in FIG. 3. A shoulder 66 on recess 56 holds the bearing in place and resists axial movement of the bearing 50 to the right in FIG. 3. Bearing 50 may be a conventional ball bearing with shields and seals or may be a bearing with special lubrication shields as is described in published application WO9960282A1. In an embodiment of the present invention, the chuck 12 of FIG. 2, bearing 52 is mounted with another singular annular elastomeric member in a second groove contained by shaft 46. Such mounting of the bearings improves the vibration characteristics of the chuck.

Figure 4:
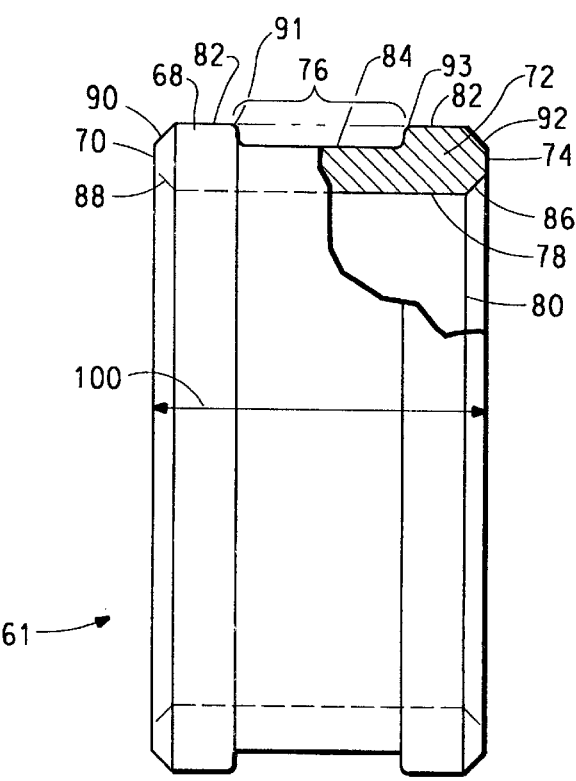
FIG. 4 is an elevation view of an annular elastomeric member from FIG. 3.

Referring now to FIG. 4 which shows a detailed embodiment of a singular annular elastomeric member 61 of the present invention. The member 61 has a first raised end region 68 at end 70 of the member and a second raised end region 72 at an opposed end 74 of the member. Between the end regions 68, 72, is a recessed region 76. (The two raised regions 68, 72 with the recessed region 76 therebetween form an H-shape when viewed as shown in FIG. 4, hence this embodiment of the elastomeric member is referred to as an H-ring.) The inner sides of the first end region, second end region and recessed region have a cylindrical boundary 78 that is aligned to define a bore 80 of the member 61. The outer sides of the first end region and second end region have a cylindrical boundary 82 that is aligned to define the outside diameter of the member 61. The surface 84 of recessed region 76 lies between boundary 78 and boundary 82. The bore 80 has chamfered ends 86 and 88. First raised end region 68 has a chamfered end 90 and second raised end region 72 has a chamfered end 92. Recessed region 76 has radiused ends 91 and 93 that may alternatively be chamfers. The member 61 is made from an elastomer such as urethane or a neoprene-based elastomer, such as Santoprene 111-35 available from Advanced Elastomer Systems L.P. of Akron, Ohio. The elastomeric member preferably has a durometer of from 25 to 50, and more preferably from 25 to 45, and most preferably from 30 to 40 on the Shore A scale. Other elastomeric materials that are believed to work are Buna-N (nitrile) elastomer, ethylene-propylene (EPM/EPDM)

rubbers, natural rubbers, synthetic rubbers (e.g. synthetic foam rubber), silicones, fluorosilicones, urethanes, polyurethanes (e.g. cast polyurethanes), neoprenes (chloroprenes), and fluorocarbon elastomers (Viton® or Fluorel®). A urethane based elastomer, such as Sorbothane® provided by Sorbothane, Inc. of Kent, Ohio, is also known to work. In some cases where bearing heat is a concern, the elastomer should have a high heat distortion temperature. For example, the Santoprene® elastomer has a heat distortion temperature of 275° F. and the Sorbothane® elastomer has a lower heat distortion temperature of 200° F.

Referring now to FIGS. 3 and 4, the elastomeric member 61 is assembled together with the bearing 50 and shaft 46 in that the elastomeric member 61 is elastically expanded so the bore 80 fits over the threaded end 94 and shaft diameter 96 and over land 63a until the member 61 is over groove 60. The elastomeric member is allowed to elastically retract until the boundary 78 of bore 80 matches the diameter 98 of the groove 60. The axial width 100 of the member 61 matches the axial width 102 of the groove 60 between ends 55 and 57. The surface 84 of recessed region 76 is free of contact with the surface 53 of inner race 58. When the elastomeric member 61 is in the groove, the boundary 82 is slightly greater than the shaft diameter 96 and is slightly greater than the diameter 104 of the inner raceway of bearing 50 by about 0.003 to about 0.011 inches. The shaft diameter 96 is slightly less than inner raceway diameter 104. The surface 53 of the inner raceway is slipped over the first and second raised end regions 68 and 72, respectively, aided by chamfer 90 and radius 93. The width 106 of the bearing inner raceway 58 between shoulders 59 and 108 is about the same as the width 100 of member 61 and the width 102 of groove 60, and the width of the bearing is substantially aligned axially with the widths 100 and 102. Substantially aligned means that the width 106 of raceway surface 53 can be wider than the groove width 102 or it can be the same as the groove width 102 or it can be narrower than the groove width 102. When the width 106 of the bearing raceway is narrower than the groove width 102, the groove width 102 should be greater than the raceway width 106 by less than the gap 65 so that excess space is eliminated for the elastomeric material to escape through during a maximum desired displacement equal to the gap distance 65. When the width of the bearing raceway is narrower, it has an advantage that the raceway can enter the groove during excessive roll vibrational displacement without damaging the groove land or the bearing raceway. When the bearing width 106 is wider than the groove width 102, it should not be so much wider that the bearing is inadequately supported and the load is concentrated on an excessively narrow width of elastomer. In the present invention, when the elastomeric member 61 has a durometer of less than 25, it presents problems when sliding the bearing raceway over the elastomer and the member tends to distort and roll over during installation. When the elastomeric member 61 has a durometer greater than 50, it tends to be difficult to stretch to expand over the groove land to seat the member in the groove at installation, and the member has a stiffness that tends to be too high for applications such as a winding chuck.

Figure 5A:
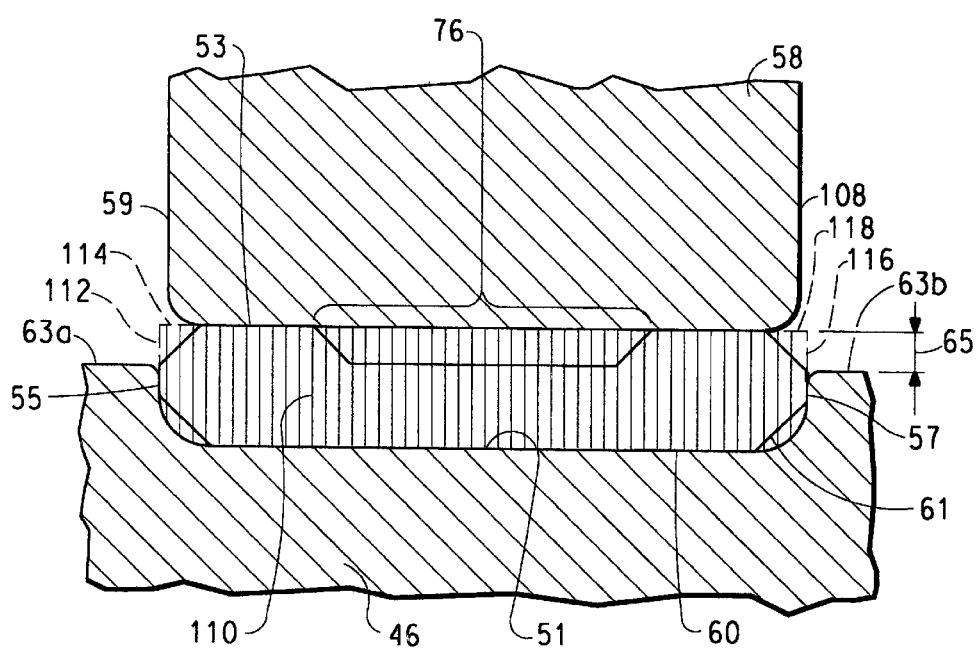
FIGS. 5A through 5E are enlarged section views of an enclosed area defined by a groove and a bearing inner race, the area containing the elastomeric member from FIG. 4.
Figure 5B:
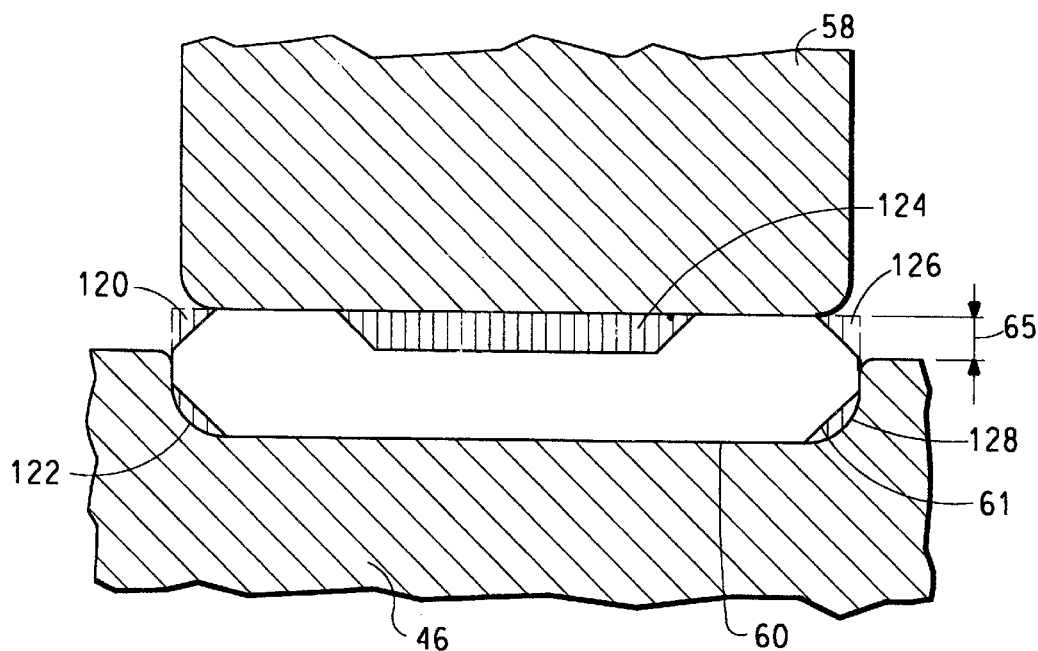

Reference is now made to FIG. 5A which shows a cross-section of an enlarged portion of FIG. 3 showing the inner raceway 58, groove 60 contained by shaft 46, and elastomeric member 61. During operation of a chuck and deformation of the mounting system, it is believed that most of the movement of the elastomer occurs radially and laterally (axially) rather than circumferentially along the bearing raceway surface and the groove, so a consideration of the cross-sectional areas defined by radial and axially dimensions is important in defining the behavior of the mounting system of the present invention. A substantially enclosed cross-sectional area 110 is shown by closely spaced hatch lines when the condition is that the raceway mounting surface 53 is concentric with the groove 60 and particularly with the groove land 63a and 63b when no substantial displacement load is present. The enclosed cross-sectional area 110 is defined by the groove bottom 51 on one side, and the raceway surface 53 on an opposed side, and the groove ends 55 and 57 on the end sides. At the gap 65, the end 55 is extended by line 112 to intersect with an extension of surface 53 by line 114 to define the left corner of the enclosed area, and the end 57 is extended by line 116 to intersect with an extension of surface 53 by line 118 to define the right corner of the enclosed area. The area 110 is an enclosed cross-sectional area occupied by the cross-sectional area of the elastomeric member 61. Because of the recessed portion 76 of the elastomeric member 61 and its chamfered corners, the elastomeric member 61 does not fully occupy the available cross-sectional area 110 at assembly. This unoccupied area is an open area that is free of the elastomeric member 61. FIG. 5B shows the open cross-sectional area in closely hatched lines that is comprised of the sum total area of individual areas 120, 122, 124, 126, and 128.

It is believed to be important that the open area is eliminated when the raceway surface 53 has moved toward the groove land 63a and 63b to close the gap 65 to zero. This condition is illustrated in FIG. 5D by the long and short dashed line 129 indicating the position of the raceway surface 53 when it has moved the distance of gap 65 so surface 53 is aligned with groove land 63a and 63b. At this position, the raceway movement will have reduced the enclosed area, deformed the elastomer member, and displaced and eliminated all of the open area in the reduced enclosed area (not shown). At this position of zero gap it is believed important that the elastomer fully occupies the now reduced enclosed area and offers maximum viscoelastic resistance to further deflection of the raceway toward the groove land. By viscoelasticity is meant the property of a material which is viscous but which also exhibits certain elastic properties such as the ability to store energy of deformation, and in which the application of a stress gives rise to a strain that approaches its equilibrium value slowly. This maximum resistance after movement of the raceway through the gap distance is important to avoid a condition where the raceway surface 53 may contact the groove land 63a and 63b that may damage the raceway 58 or support member, such as shaft 46. This infers a condition that the maximum open area should be about equal to the area displaced by the raceway movement which is about the same as the area occupied by the gap as shown by the closely hatched lines for the gap area 130 in FIG. 5C. The gap area is the product of the groove width 102 (the distance between the groove ends 55 and 57) and the radial gap 65.

Figure 5C:
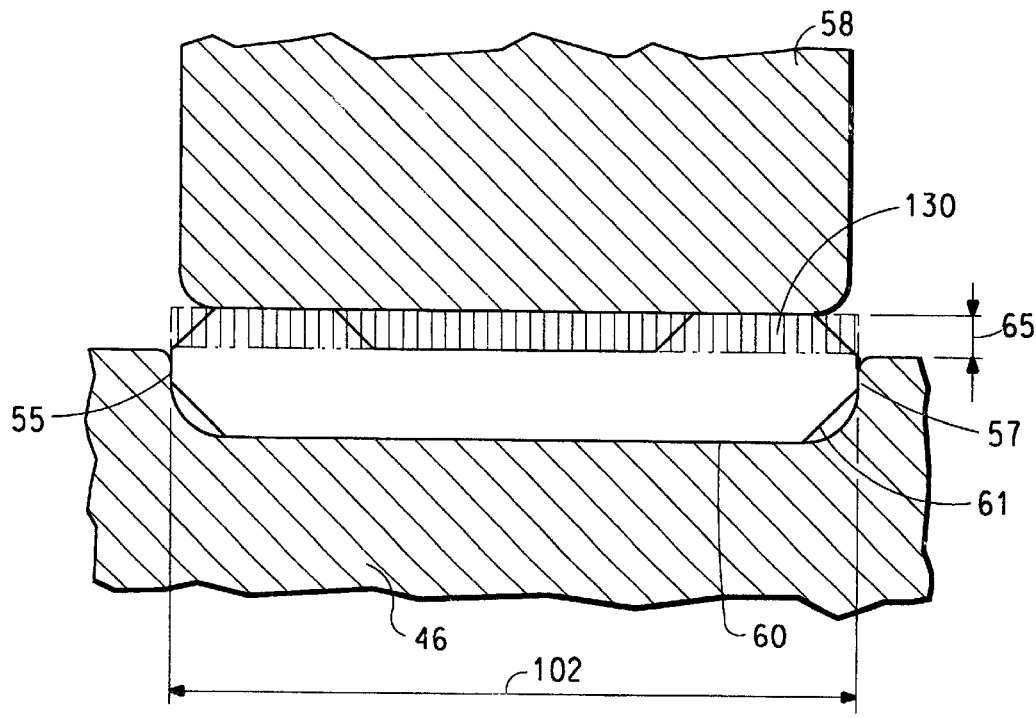
Figure 5D:
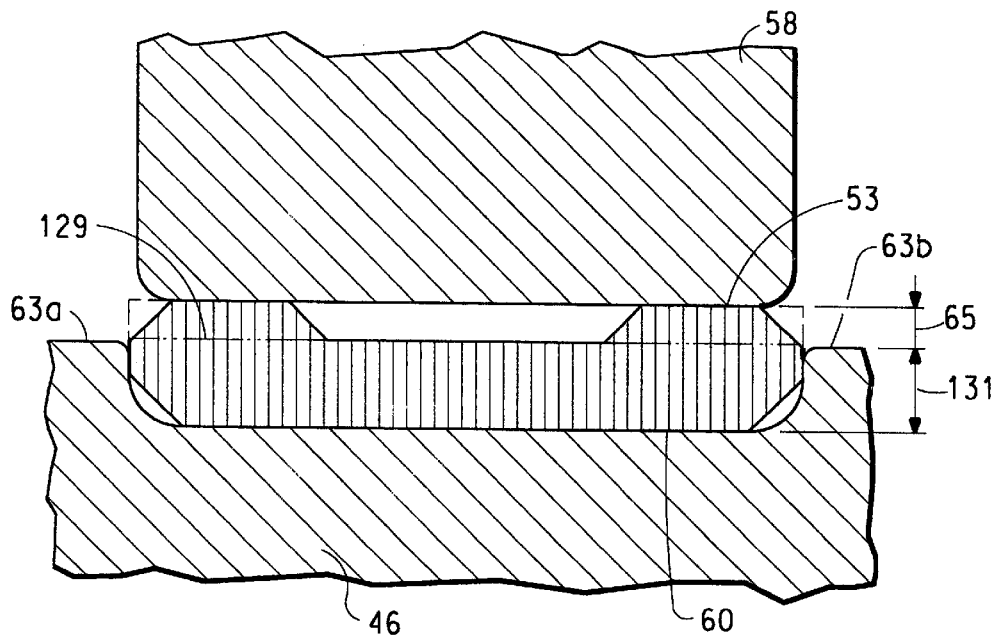

When the elastomeric member 61 of FIG. 4, is fitted in a groove 60 as shown in FIG. 5D, and contained in a substantially enclosed area 110 depicted in FIG. 5A with a gap 65 of about 0.027 inches, the open area as depicted by the sum of individual areas 120, 122, 124, 126, and 128 in FIG. 5B is about 52.3% of the gap area 130 as depicted in FIG. 5C. The open area is also about 15.6% of the enclosed area 110, which leaves about 84.4% of the enclosed area being occupied by the elastomer cross-section area before raceway displacement. When the elastomeric member of FIG. 4 is deformed by displacement of the raceway surface, the open area of about 15.6% of the enclosed area is displaced after about 14 mils of raceway displacement when the gap 65 has reduced from 27 mils to 13 mils. This configuration of bearing mount was found to control vibrations of a windup chuck roll.

Figure 5E:
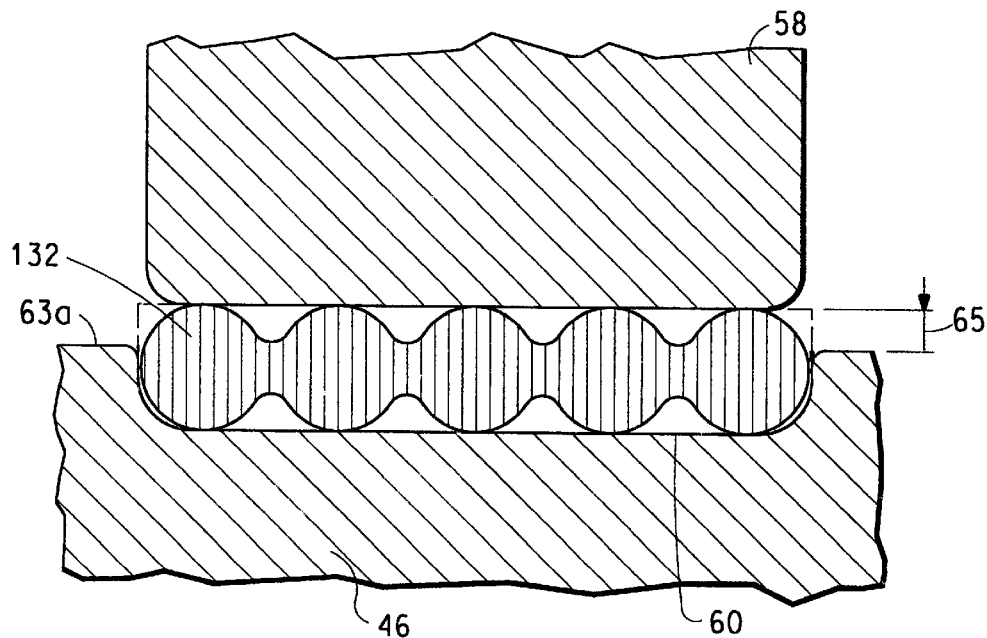

FIG. 5E shows another embodiment of the present invention of an elastomer member 132 that resembles five o-rings molded as one singular member. With the same configuration of raceway, groove and gap as in FIG. 5D, the elastomer member 132 results in an open area that is about 18.9% of the gap area and about 5.7% of the enclosed area. Thus, about 94.3% of the enclosed area is occupied by the elastomeric member 132 before raceway displacement. When the elastomeric member 132 of FIG. 5E is deformed by displacement of the raceway surface, the open area of about 5.7% of the enclosed area is displaced after about 5 mils of raceway displacement when the gap 65 is reduced from 27 mils to 22 mils. This configuration of bearing mount is believed to control vibrations of a windup chuck roll.

From the above discussion, it is concluded that the open area (meaning an area containing air or similar substance and does not contain a solid or liquid) is preferably about 15% to 100% of the gap area comprising the product of the distance between the groove ends and the gap. Referring to FIG. 5D, there is some consideration that the gap 65 not be too large relative to the depth 131 of the groove 60 so that there is ample elastomer under the raceway when the displacement has equaled the gap. In this regard, a guideline when selecting the gap area is that it be constrained to be 20% to 50% of the enclosed area with the remainder of the enclosed area representing the groove depth available for containing elastomer.

During operation of the windup, forces on the chuck can deform the elastomeric member 61 so the enclosed area decreases and the elastomeric member cross-sectional area becomes a larger proportion of the reduced enclosed cross-sectional area and the open area is occupied by the elastomeric member. The change in filling of the enclosed cross-sectional area as the elastomeric member locally deforms under vibration loading allows the elastomeric member to locally expand into the open area to more effectively reduce the vibrations between the bearing inner race and the shaft especially at low displacements. The one piece (singular) elastomeric member having in a preferred embodiment raised end regions connected by a recessed central region helps stabilize the raised end regions during installation of the bearing on the elastomeric member and during operation of the chuck. The singular elastomeric member also contains the end regions within the groove during operation of the chuck so they cannot escape through the gap. When the bearing raceway surface 53 moves toward the shaft 46 at the top of the embodiment shown in FIG. 3, there is a corresponding movement of the raceway surface 53 away from the shaft 46 at the bottom of the figure. This condition moves around the shaft as the chuck vibration occurs in all radial directions, although principally in a direction aligned with the force of gravity. This deformation absorbs a significant amount of energy and acts to control the vibration causing such deformation. The mount needs to be soft to achieve a low final natural frequency especially during the time the yarn package is reaching maximum size on the chuck. However, large deflections of the soft elastomer need to be limited so as the soft elastomer deforms more, the stiffness needs to be higher. Such a non-linear stiffening effect is generated by substantially containing the elastomer and an open area in a groove adjacent a raceway mounting surface. The groove constrains the elastomer as it viscoelastically deforms under high deflection thus elevating the spring constant of the mounting system.

Figure 6:
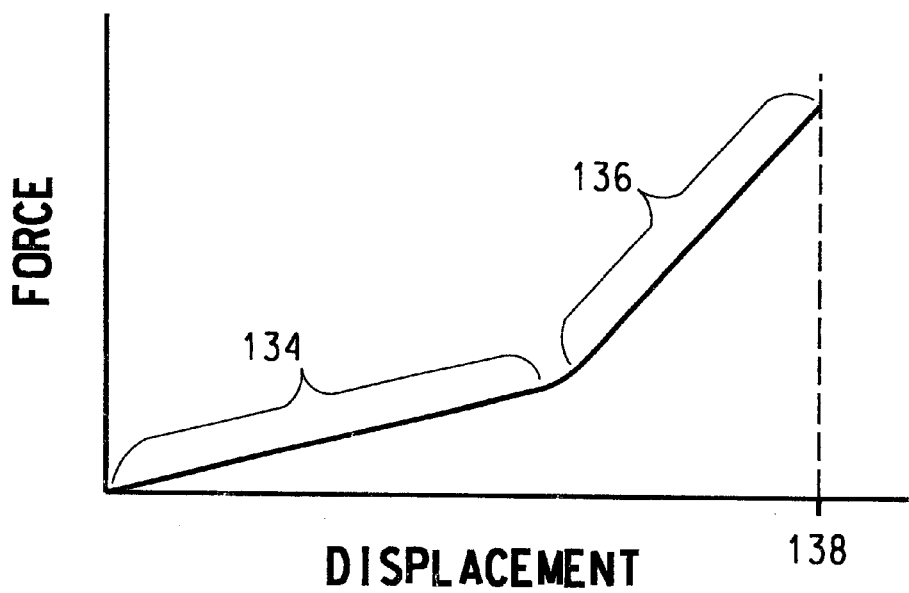
FIG. 6 illustrates a force versus displacement curve that characterizes the mounting system in accordance with the present invention.

The arrangement of a singular annular elastomer member of the present invention, such as member 61 or 132, in a substantially enclosed area, including an open area between a groove and a bearing raceway mounting surface provides a unique dual rate stiffness to resist roll vibration. FIG. 6 illustrates a force versus displacement curve that characterizes the mounting system just described. Such a curve can be obtained by mounting the elastomeric member on a shaft and mounting a bearing over the member and supporting the assembly under the crosshead of a testing machine such as an Instron tester. The crosshead can be moved to exert a force on the bearing at a rate of 0.2 inches per minute. A load cell on the crosshead would record the force developed as the bearing is deflected toward the land of the groove. It has been noticed that the first cycle of the test produced a different response than subsequent cycles so the data from the subsequent cycles would be recorded as typical. The result of such testing indicated that the mounting system could be expected to have a first stiffness during an initial displacement as indicated by the slope of the curve at 134, and a second stiffness during subsequent displacement as indicated by the slope of the curve at 136. The second stiffness at 136 occurred before the displacement equaled the gap distance at 138. It is believed that the open area, the gap area involving the gap distance, and the viscoelastic properties of the elastomer play a role in producing this dual stiffness characteristic of the invention. It is believed the stiffness of the system is related to the resistive forces of the elastomer as it deforms within the substantially enclosed region between the groove and the bearing raceway and to the tendency of the elastomer to squeeze into the gap. It is believed important to provide an open area within the enclosed cross-sectional area that is free of singular member elastomer, the open area being 15% to 100% of a gap area comprising the product of the distance between the groove ends and the gap, so that when there is relative movement to reduce the distance between the surface of the raceway and the groove land which deflects the singular member elastomer and reduces the enclosed area, the open area is reduced or eliminated and the singular member elastomer viscoelastically deforms so that the mounting system provides a first rate of stiffness during the initial movement and a second rate of stiffness as the movement continues and before the radial deflection exceeds the radial gap, the second stiffness greater than the first stiffness. In some cases, the elastomeric member is believed to behave hydrostatically when the open area has been eliminated by displacement of the raceway mounting surface and the elastomeric member cannot viscoelastically move under the forces present through the remainder of gap 65. By hydrostatic deformation is meant the deformation of a liquid or flowable plastic material under pressure that is governed by the body of knowledge in fluid mechanics called hydrostatics. Most liquids and elastomers have a very low deformation hydrostatically when they are completely contained.

Dynamic testing of the chuck has examined different elastomers for the singular elastomeric member of FIG. 4, and a variation of the multiple member O-ring system. A translucent 30 durometer urethane elastomer, a black 30 durometer Sorbothane® elastomer, and a white 30 durometer Sorbothane® elastomer. To date, only one durometer has been tested, but it is believed a range of durometers from 25 to 45 Shore A would work for the described application and other durometers would work depending on the application. The H-shape elastomer member shown in FIG. 4 was tested and has worked well. Other shapes described herein are believed to perform as well. A two piece mount with a rigid recessed region was tried, but the performance was inferior to the one piece resilient mount.

Figure 7A:
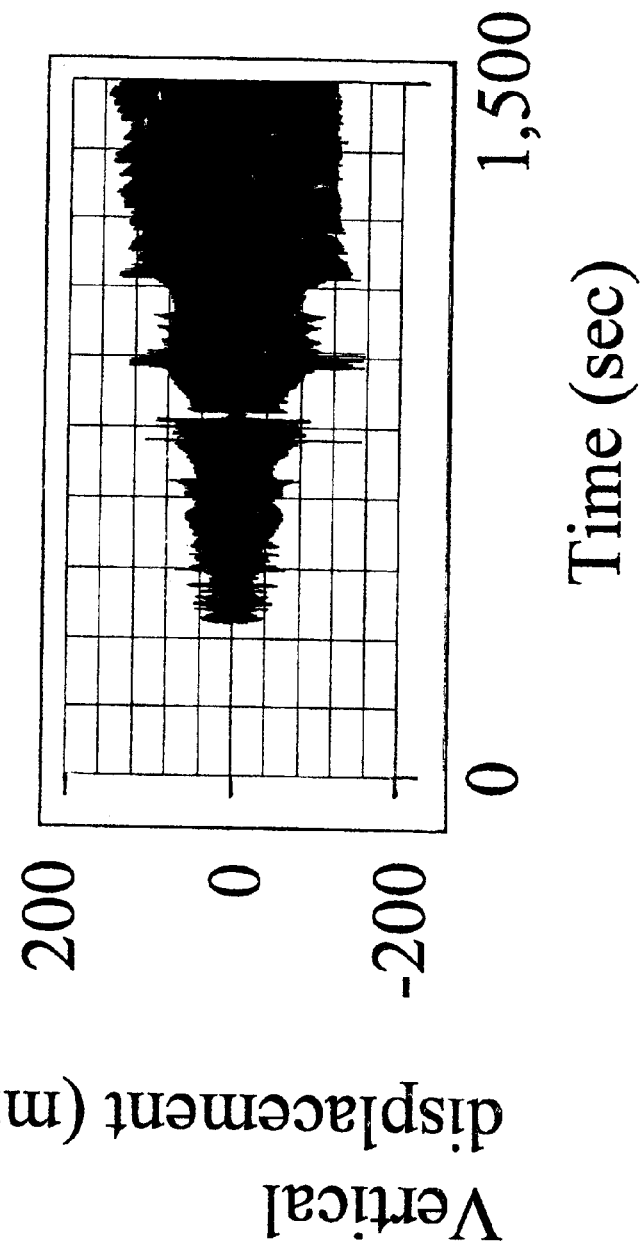
FIGS. 7A, 7B, 7C, 7D and 7E show vibration plots for several different bearing mounts for a single windup chuck holding two packages.
Figure 7B:
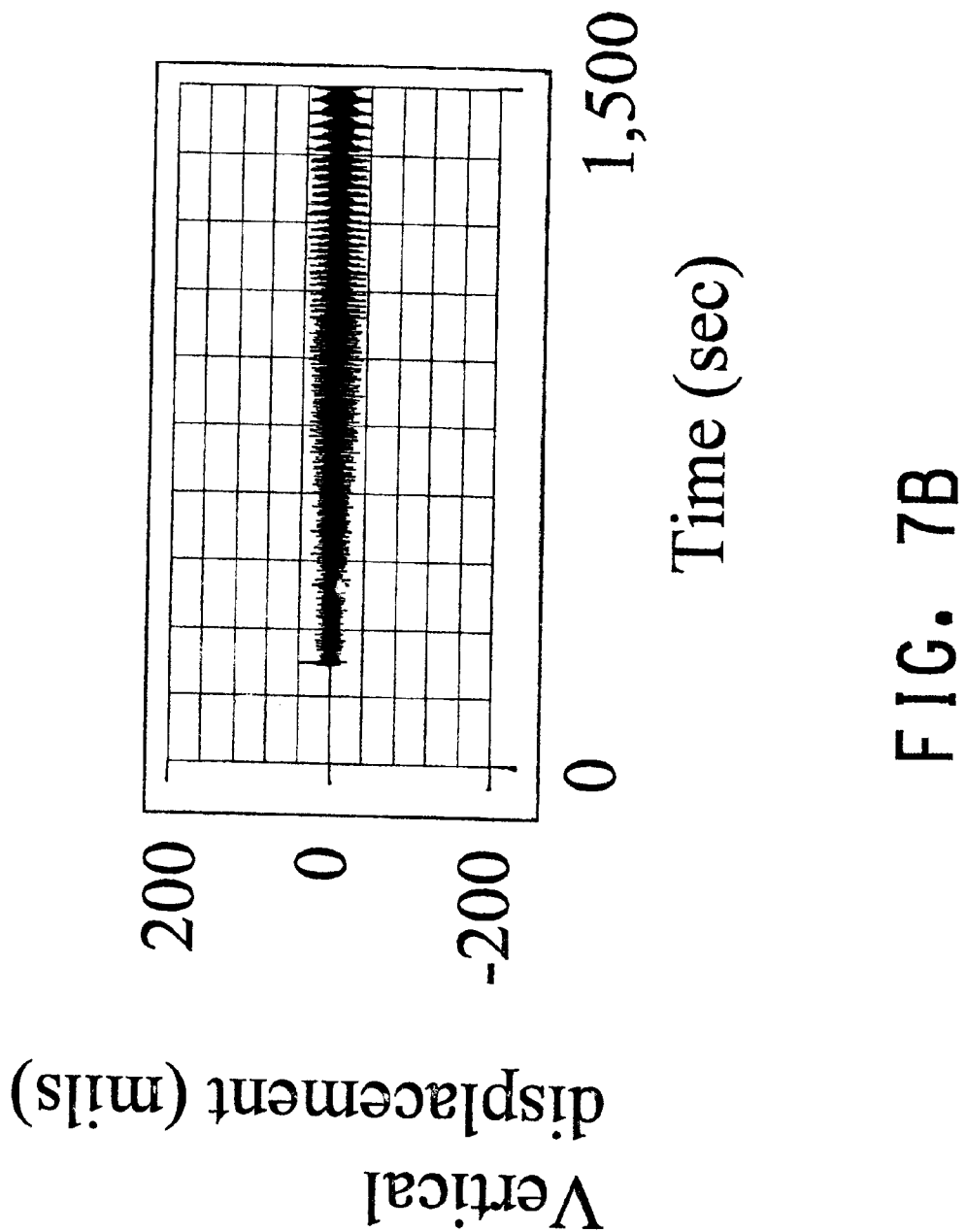

FIGS. 7A, 7B, 7C, 7D, and 7E show vibration plots for several different bearing mounts for a single windup chuck holding two packages. The vertical axis shows vertical displacement of the end of the center of the chuck from a neutral position in mils; the full scale showing +/−200 mils. There is also a horizontal component of chuck vibration that was measured, but the vertical component was usually more and so more accurately represents the problem. The horizontal axis shows the test duration time in seconds with the beginning of the trace indicating the start of vibration monitoring at some brief random time after the start of winding, and the right end of the trace indicating the end of monitoring at the formation of a full package and just before stopping the winding. A typical winding time to achieve a full package is about 23 minutes (1380 seconds). Unless mentioned otherwise, the chuck has major components, such as the shaft and shell made of steel or aluminum, has two nylon BCF packages of yarn each weighing about 10.8 lbs. at the time of doff, is winding yarn at a speed of 1400–1600 ypm, has a chuck to drive roll force maintained at about 30 lbs. as the package builds, and has a speed of from about 5600 to 1700 rpm as the package builds. In FIG. 7A, the bearings are mounted on 5 Viton® O-rings of 70 durometer Shore A snugly contained in a groove. An aluminum chuck shell is used, but use of a steel chuck produced similar results. The vibration starts out low at the left of the plot and gradually increases with a few spikes at resonant frequencies until the end of the chuck is vertically oscillating about +/−150 mils at the end of the wind cycle at the right of the plot. In FIG. 7B, the bearings are mounted on 5 white silicone O-rings of 40 durometer Shore A on aluminum shell chucks. The vibration is much improved over 7A and resonant frequencies are effectively controlled, but after several cycles of package winding operation, the individual low durometer O-rings worked out of the groove and the chuck bearing mount had to be repaired. It is believed that if the five o-rings were molded into a singular member like member 132 in FIG. 5E, they would have offered similar vibration control to that in FIG. 7B and would have been an acceptable bearing mount since individual O-rings would not be present to work out of the groove.

Figure 7C:
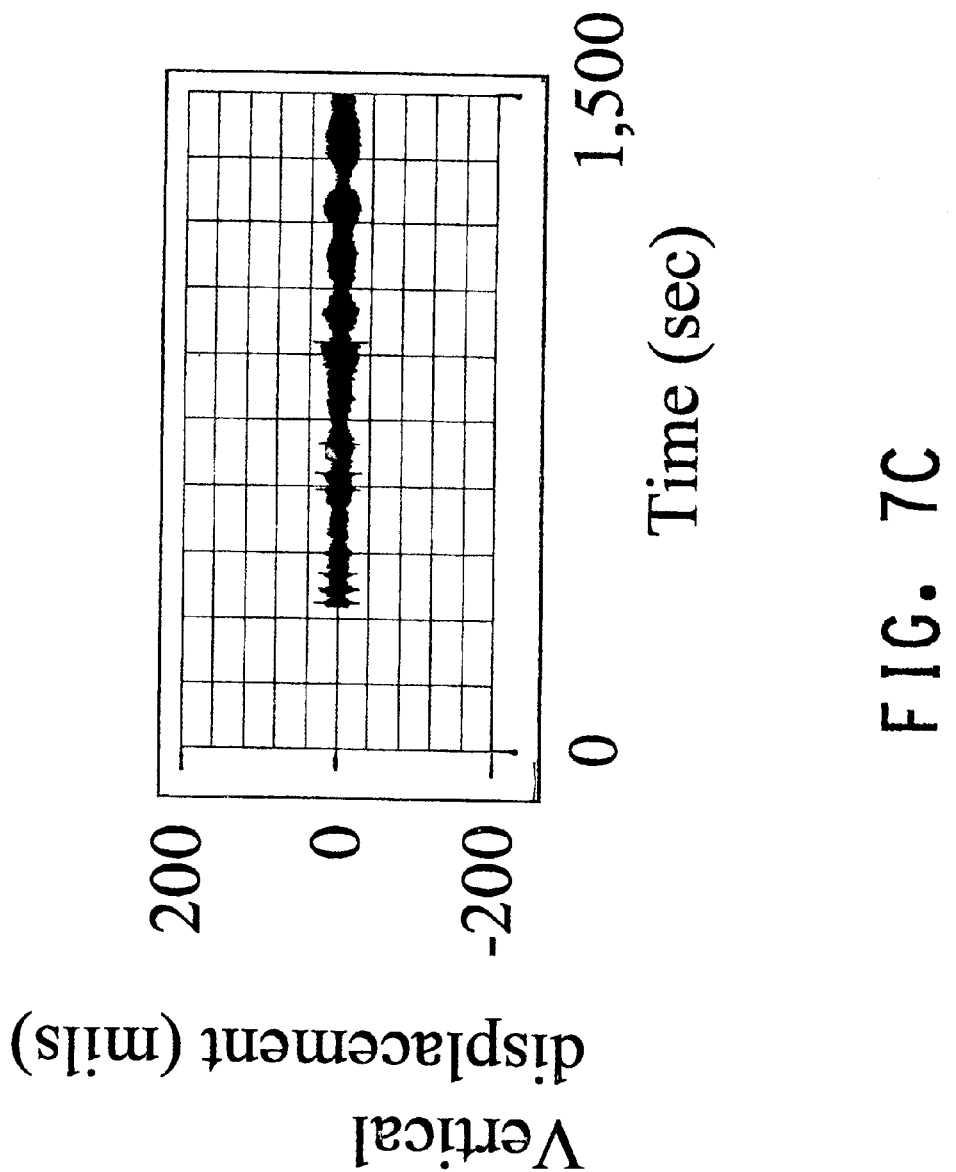
Figure 7D:
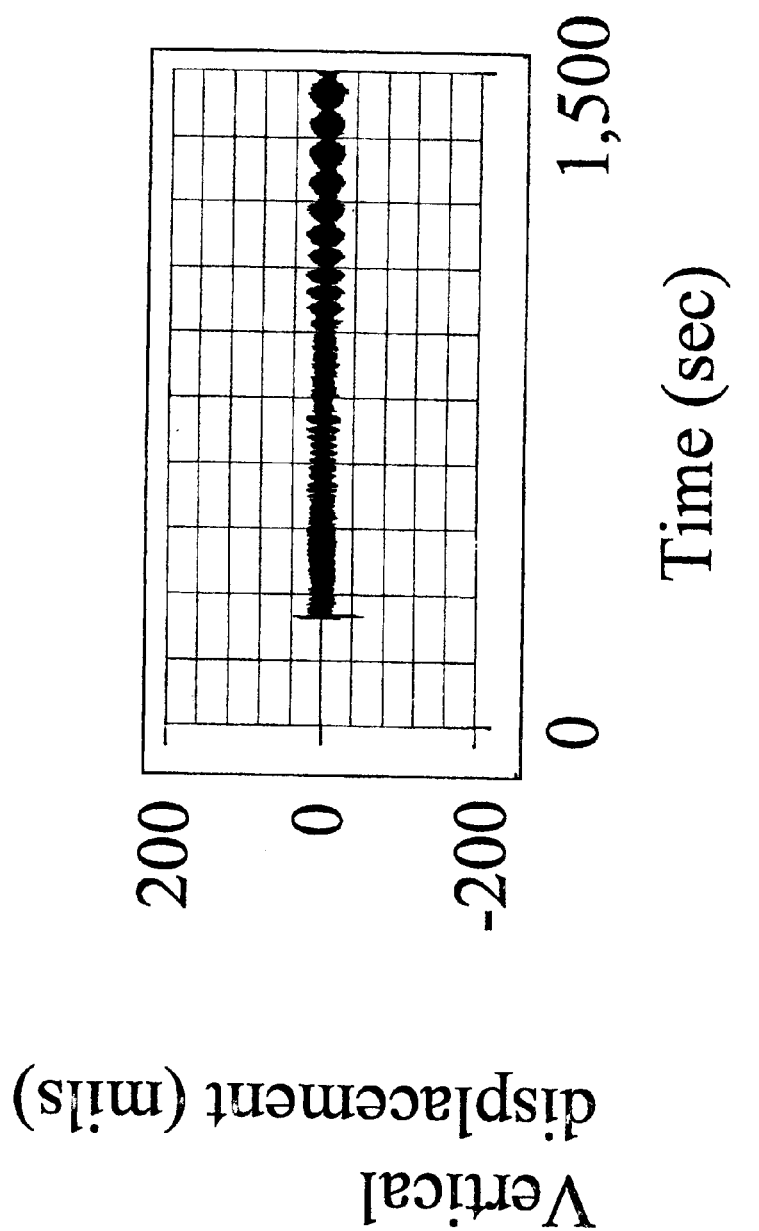
Figure 7E:
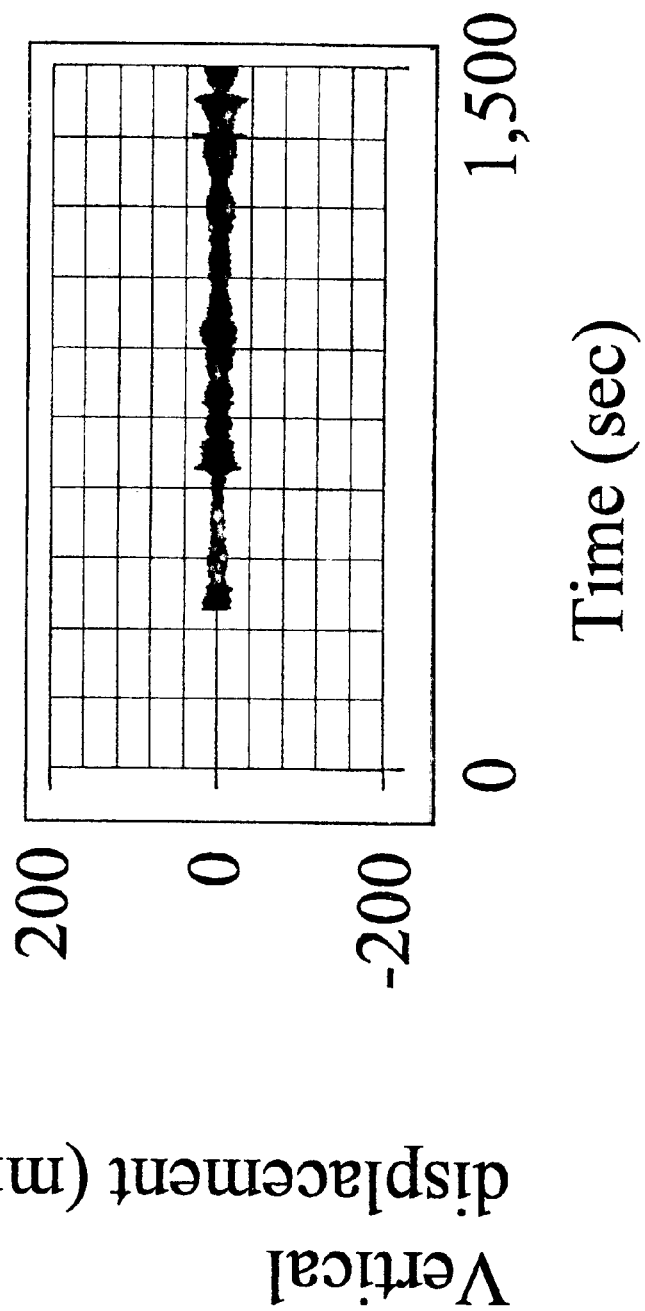

In FIG. 7C, the bearings are mounted on a single one-piece translucent urethane elastomeric member, of the present invention, as in FIG. 4 made with a durometer of 30 Shore A snugly contained in a groove. The chuck has an aluminum shell. Resonant frequencies are still detectable, but the amplitude of vibration is within acceptable limits of +/−35 mils throughout the entire package wind cycle. About 15–20 mils total displacement of the end of the chuck represents the target static runout of the chuck, so the displacement due to vibration is very low. In FIG. 7D, the bearings are mounted on a single one-piece black Sorbothane® elastomeric member as in FIG. 4 made with a durometer of 30 Shore A snugly contained in a groove. The chuck has a steel shell. Resonant frequencies are not detectable and the vibration amplitude is within acceptable limits. In FIG. 7E, the bearings are mounted on a single one-piece black Sorbothane® elastomeric member as in FIG. 4 made with a durometer of 30 Shore A snugly contained in a groove, and the chuck shaft and shell are aluminum to reduce the mass of the vibrating assembly. Resonant frequencies are detectable but the vibration amplitude is within acceptable limits. A test similar to that in FIG. 7E was run with a one piece Santoprene® elastomeric member as in FIG. 4 made with a durometer of 35 Shore A snugly contained in a groove. It had vibration reduction performance similar to that shown in FIG. 7E.

Figure 8A:
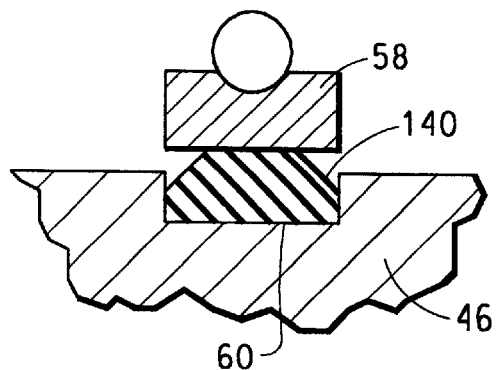
FIGS. 8A through 8E show alternate embodiments of the present invention.
Figure 8B:
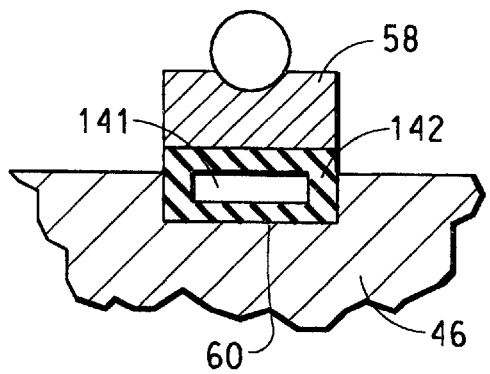
Figure 8C:
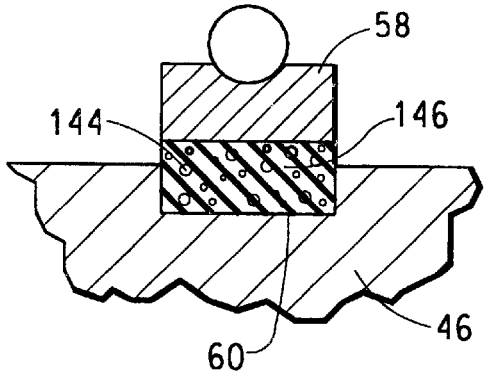
Figure 8D:
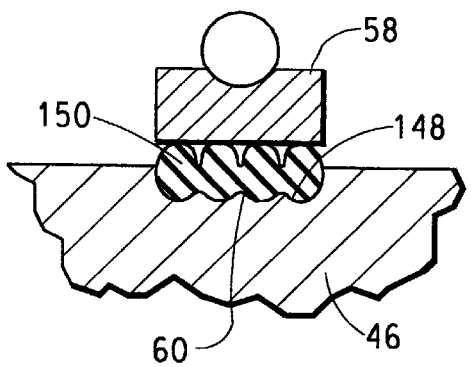
Figure 8E:
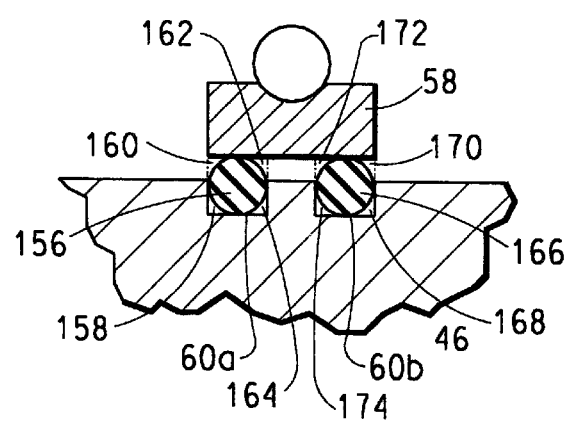

Various alternative embodiments of the present invention are shown in the following figures. FIGS. 8A, 8B, 8C, and 8D show variations in the arrangement of the elastomeric member cross-section and the location of the open area. In FIG. 8A, a trapezoidal shape elastomeric member is contained in groove 60 between support member 46 and raceway 58. In FIG. 8B, the open area is contained within the elastomer by forming a single open channel 141 surrounded by elastomeric material 142. In FIG. 8C, the open area is contained within the elastomer member by forming many bubbles, such as bubble 144, within the elastomeric material 146. In FIG. 8D, the bottom of the groove 60 conforms to an undulating surface 148 of the elastomeric member 150. In an embodiment of the present invention shown in FIG. 8E, there are multiple grooves 60a and 60b between the support member 46 and raceway 58. Groove 60a has an elastomeric member 156 and open areas 158, 160, 162, and 164. Groove 60b has an elastomeric member 166 and open areas 168, 170, 172, and 174.

Figure 9A:
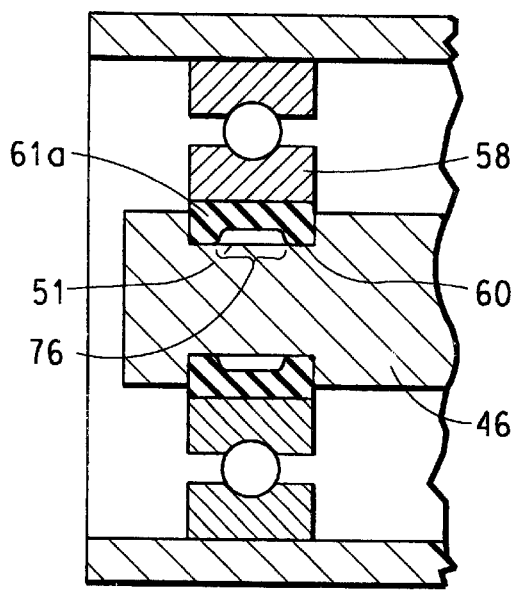
FIGS. 9A through 9C show alternate embodiments of the present invention.
Figure 9B:
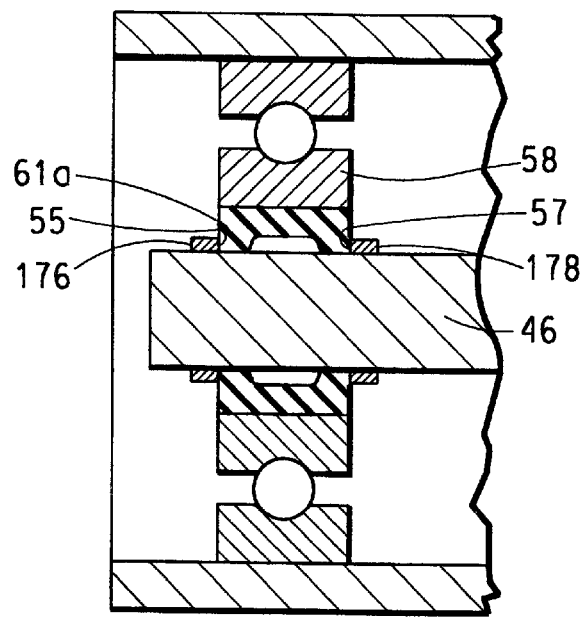
Figure 9C:
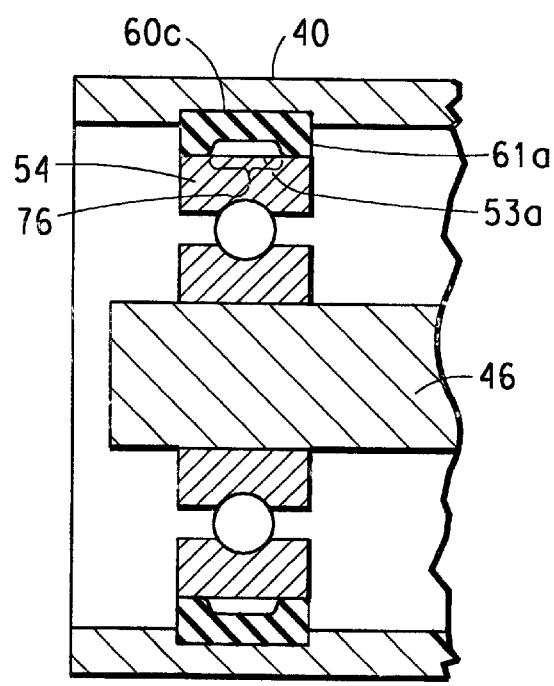

FIG. 9A illustrates an embodiment where the elastomeric member 61a is molded in a shape that is an inverted version of the embodiment of FIG. 4 where the recessed region 76 is facing the bottom 51 of the groove 60. FIG. 9B illustrates an embodiment similar to FIG. 9A where the groove end 55 is formed by a side of a first ring 176 on support member shaft 46 and groove end 57 is formed by a side of a second ring 178 on shaft 46. FIG. 9C illustrates an embodiment where the groove 60c is located in the roll 40 and the raceway support surface 53a is on the outer raceway 54. The inverted elastomeric member 61a from FIG. 9A now has the recessed region 76 facing the raceway support surface 53a.

Figure 10:
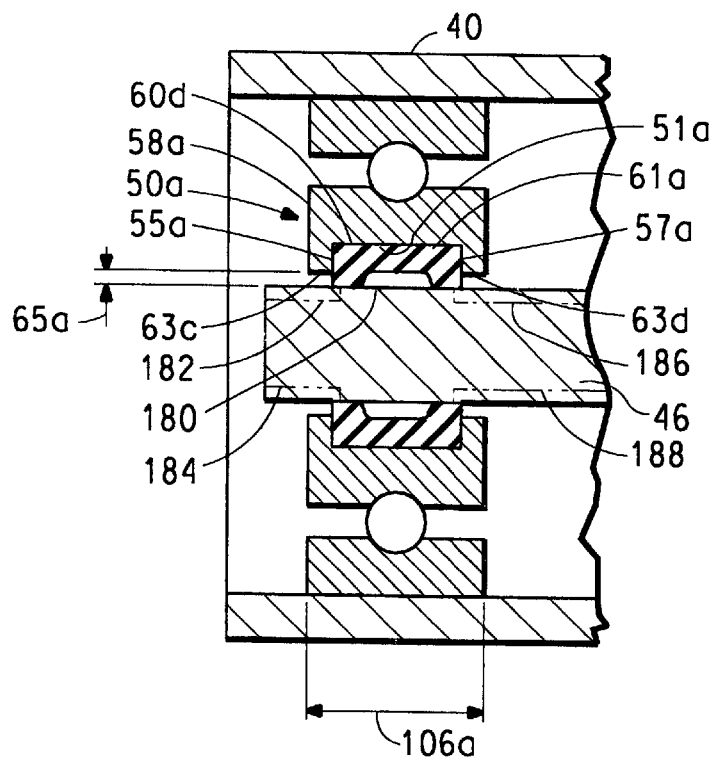
FIG. 10 shows an embodiment of a mounting system for a rotary bearing having an inner raceway and an outer raceway.

FIG. 10 shows an embodiment of a mounting system for a rotary bearing having an inner raceway and an outer raceway, used to support a rotating roll on a stationary support member where the annular groove 60d is contained in the inner raceway 58a on the bearing 50a, adjacent a load bearing surface 180 on the support member shaft 46. The annular groove 60d has a bottom 51a with ends 55a and 57a opposite one another, the ends being inside a structurally effective width 106a of the inner raceway 58a. The groove 60d has a land 63c and 63d defining the top of the groove with the land 63c and 63d radially spaced from the load bearing surface 180 by a predetermined radial gap 65a. A substantially enclosed cross-sectional area is defined when the bearing surface 180 is concentric with the groove 60d with substantially no displacement of the raceway. The enclosed area is defined by the groove bottom 51a on one side, the load bearing surface 180 on an opposed side, and the groove ends 55a and 57a, with the extension of the groove ends intersecting the load bearing surface at gap 65a, on the end sides. A singular annular member 61a is mounted in the groove and contacts the bottom of the groove 51a and the load bearing surface 180, the singular member having a cross-sectional area that is contained within the enclosed cross-sectional area.

There is an open area within the enclosed cross-sectional area that is free of the singular member elastomer, the open area being 15% to 100% of a gap area comprising the product of the distance between the groove ends 55a and 57a and the gap 65a. This open area contributes to the performance so that when the load bearing surface 180 and the land 63c and 63d move relatively toward one another deflecting the singular member elastomer 61a and reducing the enclosed area, the open area is reduced or eliminated and the singular member elastomer viscoelastically deforms. By this deformation the mounting system provides a first rate of stiffness during the initial deflection and a second rate of stiffness as the deflection continues and before the radial deflection exceeds the radial gap 65*a*. The second stiffness is greater than the first stiffness.

An alternative support surface configuration is illustrated by the broken lines 182, 184, 186, and 188 which shows a new surface profile for shaft 46 where support surface 180 is only present adjacent the inner raceway 58*a* and a width 190 of surface 180 is slightly narrower than the groove width between ends 55*a* and 57*a*. This will allow surface 180 to enter groove 60*d* in case of excessive displacement of the raceway 58*a* toward the support surface 180 thereby minimizing the chance of undesired contact between surface 180 and groove land 63*c* and 63*d*.

Figure 11:
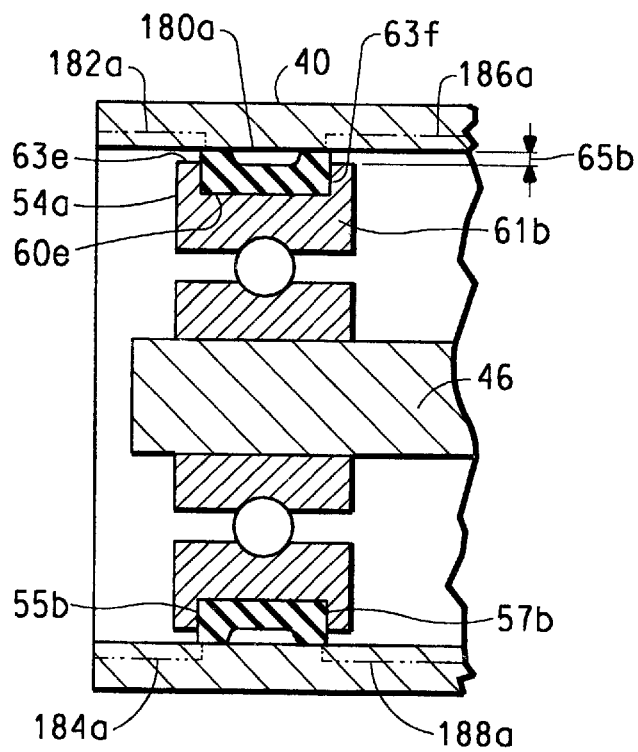
FIG. 11 shows a variation of the configuration of FIG. 10.

FIG. 11 shows a variation of the configuration of FIG. 10 where the groove 60*e* is in the outer raceway 54*a* and the support surface 180*a* is contained in the roll 40. Singular annular elastomeric member 61*b* and an open area are contained in the enclosed area between groove 60*e* and raceway land 63*e* and 63*f*. The land 63*e* and 63*f* are spaced from support surface 180*a* by gap 65*b*. An alternative support surface configuration is illustrated by the broken lines 182*a*, 184*a*, 186*a*, and 188*a* which shows a new surface profile for roll 40 where support surface 180*a* is only present adjacent the outer raceway 54*a* and a width 190*a* of surface 180*a* is slightly narrower than the groove width between ends 55*b* and 57*b*. This will allow surface 180*a* to enter groove 60*e* in case of excessive displacement of the raceway 54*a* toward the support surface 180*a* thereby minimizing the chance of undesired contact between surface 180*a* and groove land 63*e* and 63*f*.

Figure 12A:
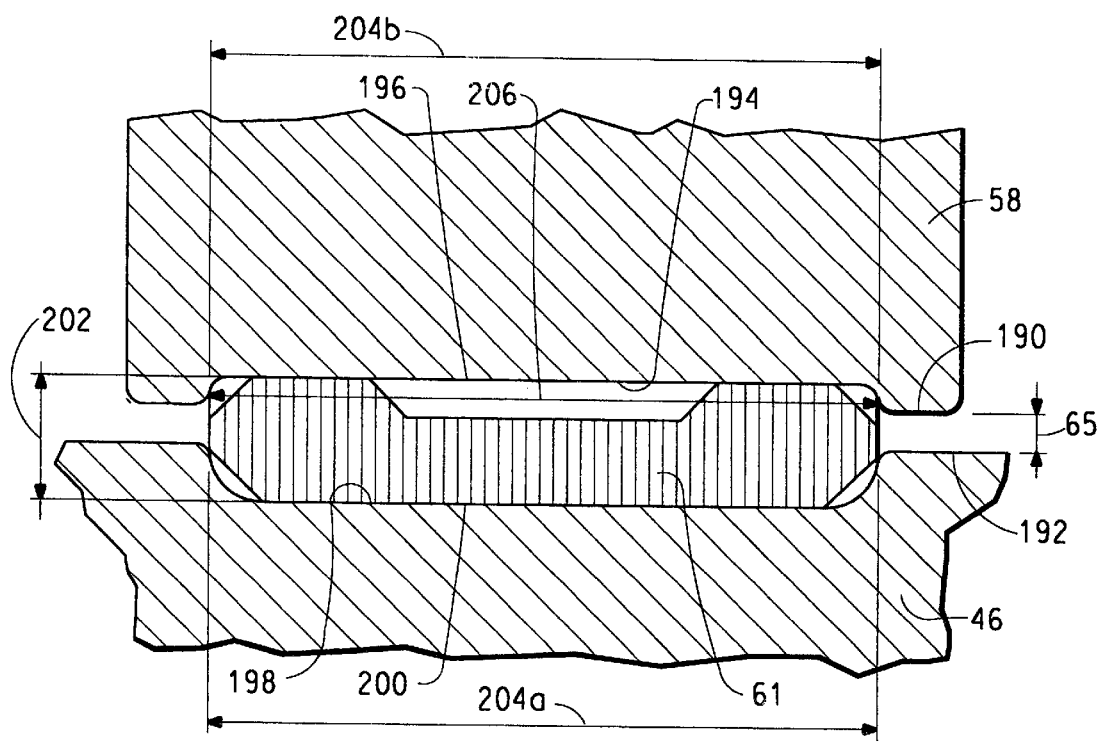

FIG. 12A shows a further embodiment where the raceway mounting surface is spaced from an adjacent support surface by a predetermined radial gap and a groove is contained partially in the raceway mounting surface and partially in an adjacent support surface to define the substantially enclosed area that contains the elastomeric member and the open area and the gap area. The raceway would ordinarily have a minor groove portion that could be axially slipped over the elastomeric member that may be lubricated for that purpose at assembly of the chuck. An inner raceway mounting surface 190 on inner raceway 58 is spaced from an adjacent support surface 192 contained in the stationary support member, shaft 46. The raceway mounting surface 190 is spaced from support surface 192 by predetermined radial gap 65 when the raceway mounting surface is concentric with the support surface. A substantially enclosed cross-sectional area similar to enclosed area 110 in FIG. 5A has a top at surface 194 in a groove feature 196 on the raceway mounting surface 190 and a bottom at surface 198 in a groove feature 200 on the support surface 192. The distance between the top of the enclosed area at 194 and the bottom of the enclosed area at 198 defines an enclosed area depth 202. The enclosed area has a width 206 defined either by the width 204*a* of the groove feature 200 on the support surface 192 or the width 204*b* of the groove feature 196 on the raceway mounting surface 190, since the widths are about the same and are substantially aligned with one another, although such equal widths and alignment of the widths is not required. In the case of unequal widths, the larger of the widths, which would be the width encompassing the gap, would be the width used to define the geometry of the mounting system. The enclosed area includes the radial gap 65 thereby establishing a width 206 for the gap that equals the enclosed area width 204*a* or 204*b* so that a gap area, similar to gap area 130 in FIG. 5C, is defined comprising the product of the radial gap 65 and the gap width 206. A singular annular member 61 comprising an elastomer is mounted in the enclosed area and contacts the bottom (at surface 198) and top (at surface 194) of the enclosed area. The singular member 61 has a cross-sectional area shown by heavy hatched lines that is contained within the enclosed cross-sectional area having depth 202 and width 204*a* or 204*b*. An open area, similar to the sum of open areas 120, 122, 124, 126, and 128 in FIG. 5B is present within the enclosed cross-sectional area. The open area is free of singular member 61 elastomer material and is a space ordinarily filled with uncontained air which is available for the elastomer to move into as it deforms. It is preferred that the open area is related to the gap area wherein the open area is 15% to 100% of the gap area so that when there is relative radial movement to reduce the distance between the raceway mounting surface and the support surface which deflects the singular member elastomer and reduces the enclosed area, the open area is reduced or eliminated and the singular member elastomer viscoelastically deforms so that the mounting system provides a first rate of stiffness during the initial movement and a second rate of stiffness as the movement continues and before the relative movement exceeds the radial gap, the second stiffness being greater than the first stiffness.

Figure 12B:
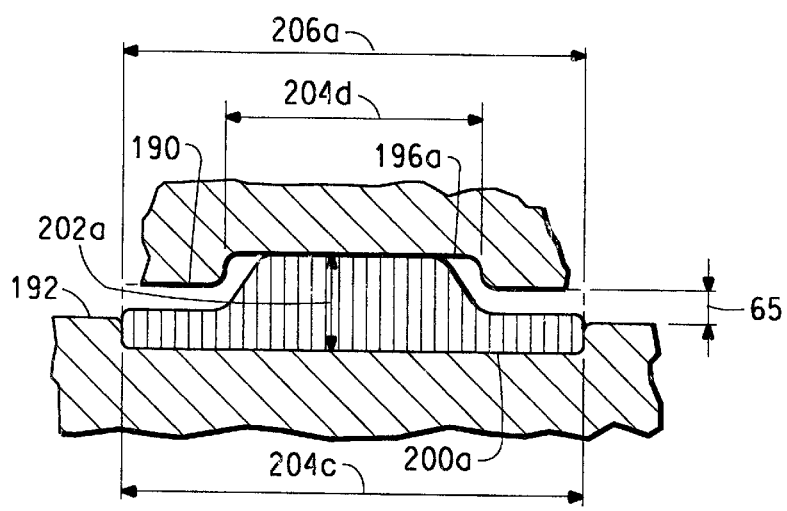
FIG. 12B shows a variation of the mounting system of FIG. 12A.

FIG. 12B shows a variation of the mounting system of FIG. 12A where the width 204*c* of feature 200*a* on support surface 192 is not the same as width 204*d* of feature 196*a* on raceway mounting surface 190. The enclosed area has a depth 202*a* between the two features and a width 204*c* that extends through the gap 65 and a width 204*d* above the gap. The gap area has a width 206*a* that is the same as enclosed area width 204*c*.

Although FIGS. 12A and 12B show the enclosed area, elastomeric member, open area and gap area between the inner raceway 58 and support member shaft 46, it is obvious that the elements of the mounting system could be between the outer raceway 54 and roll 40 as is depicted similarly in FIG. 9C and the alternative variations of FIGS. 8A, 8B, 8C, 8D, and 8E could also be applied to the embodiments of FIGS. 12A and 12B.

Figure 13A:
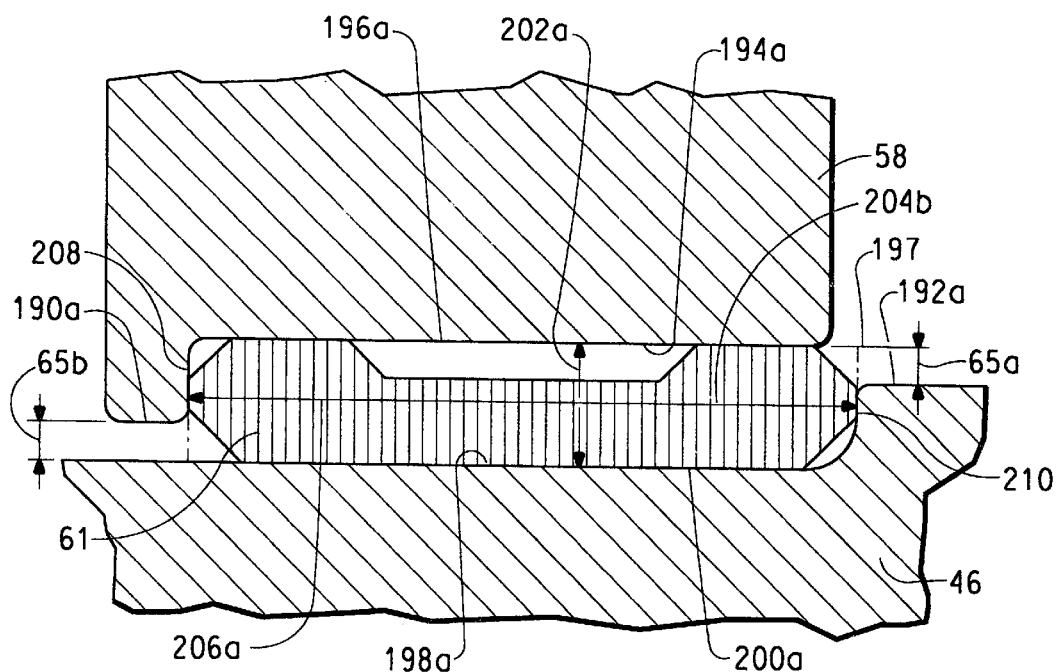

FIG. 13A shows a further embodiment where the raceway mounting surface is spaced from an adjacent support surface by a predetermined radial gap and a groove is contained partially in the raceway mounting surface and partially in an adjacent support surface by a step feature to define the substantially enclosed area that contains the elastomeric member and the open area and the gap area. The step feature alleviates the axial assembly challenge presented by the embodiment of FIGS. 12A and 12B that required deformation and lubrication of the elastomeric member. An inner raceway mounting surface 190*a* on inner raceway 58 includes a step feature 196*a* that may be actually or virtually extended as indicated by dashed lines 197 to define a relationship with an adjacent support surface 192*a* contained in the stationary support member, shaft 46. The step feature 196*a* of raceway surface 190*a* is spaced from adjacent support surface 192*a* by a predetermined radial gap 65*a* when the raceway mounting surface is concentric with the support surface. Support surface 192*a* includes a step feature 200*a* that is complementary to the step feature 196*a* on raceway surface 190*a*. The step feature 200*a* of support surface 192*a* is spaced from raceway surface 190*a* by a predetermined radial gap 65*b*. In practice, gap 65*a* and 65*b* would probably be the same, but if they were different, the smaller of the gaps 65a and 65b would be the controlling gap in the mounting system. A substantially enclosed cross-sectional area similar to enclosed area 110 in FIG. 5A has a top at surface 194a in step feature 196a on the raceway mounting surface 190a and a bottom at surface 198a in step feature 200a on the support surface 192a. The distance between the top of the enclosed area at 194a and the bottom of the enclosed area at 198a defines an enclosed area depth 202a. The enclosed area has a width 206a defined between the step end 208 (of step feature 196a on the raceway mounting surface 190a) and the step end 210 (of the step feature 200a on the support surface 192a). The enclosed area includes the radial gap 65a and the radial gap 65b thereby establishing a width for the gap that equals the enclosed area width 206a. The smaller of the gaps 65a and 65b would be chosen as the representative gap so that a gap area, similar to gap area 130 in FIG. 5C, is defined comprising the product of the smaller of the radial gaps 65a and 65b, and the gap width 206a. A singular annular member 61 comprising an elastomer is mounted in the enclosed area and contacts the bottom (at surface 198a) and top (at surface 194a) of the enclosed area. The singular member 61 has a cross-sectional area shown by heavy hatched lines that is contained within the enclosed cross-sectional area having depth 202a and width 206a. An open area, similar to the sum of open areas 120, 122, 124, 126, and 128 in FIG. 5B is present within the enclosed cross-sectional area. The open area is free of singular member 61 elastomer material and is a space ordinarily filled with uncontained air which is available for the elastomer to move into as it deforms. It is preferred that the open area is related to the gap area wherein the open area is 15% to 100% of the gap area so that when there is relative radial movement to reduce the distance between the raceway mounting surface and the support surface which deflects the singular member elastomer and reduces the enclosed area, the open area is reduced or eliminated and the singular member elastomer viscoelastically deforms so that the mounting system provides a first rate of stiffness during the initial movement and a second rate of stiffness as the movement continues and before the relative movement exceeds the radial gap, the second stiffness being greater than the first stiffness.

Although FIG. 13A shows the enclosed area, elastomeric member, open area and gap area between the inner raceway 58 and support member shaft 46, it is obvious that the elements of the mounting system could be between the outer raceway 54 and roll 40 as is depicted similarly in FIG. 9C and the alternative variations of FIGS. 8A, 8B, 8C, 8D, and 8E could also be applied to the embodiment of FIG. 13A. Also, the general naming of the elements in FIGS. 12A, 12B, and 13A could apply as well to the elements discussed in reference to all the previously described figures of the present invention. That description being as follows: mounting system for a rotary bearing having an inner raceway and an outer raceway, each having a mounting surface, used to support a rotating roll on a stationary support member, comprises: a predetermined radial gap spacing apart the raceway mounting surface and an adjacent support surface when the raceway mounting surface is concentric with the support surface; a substantially enclosed cross-sectional area having a top and bottom defined by features on the raceway mounting surface and the adjacent support surface thereby defining an enclosed area depth, the enclosed area having a width and the enclosed area including the radial gap thereby establishing a width for the gap that equals the enclosed area width so that a gap area is defined comprising the product of the radial gap and the gap width; a singular annular member comprising an elastomer, the singular member mounted in the enclosed area and contacting the bottom and top of the enclosed area, the singular member having a cross-sectional area that is contained within the enclosed cross-sectional area; and an open area within the enclosed cross-sectional area that is free of singular member elastomer.

Figure 13B:
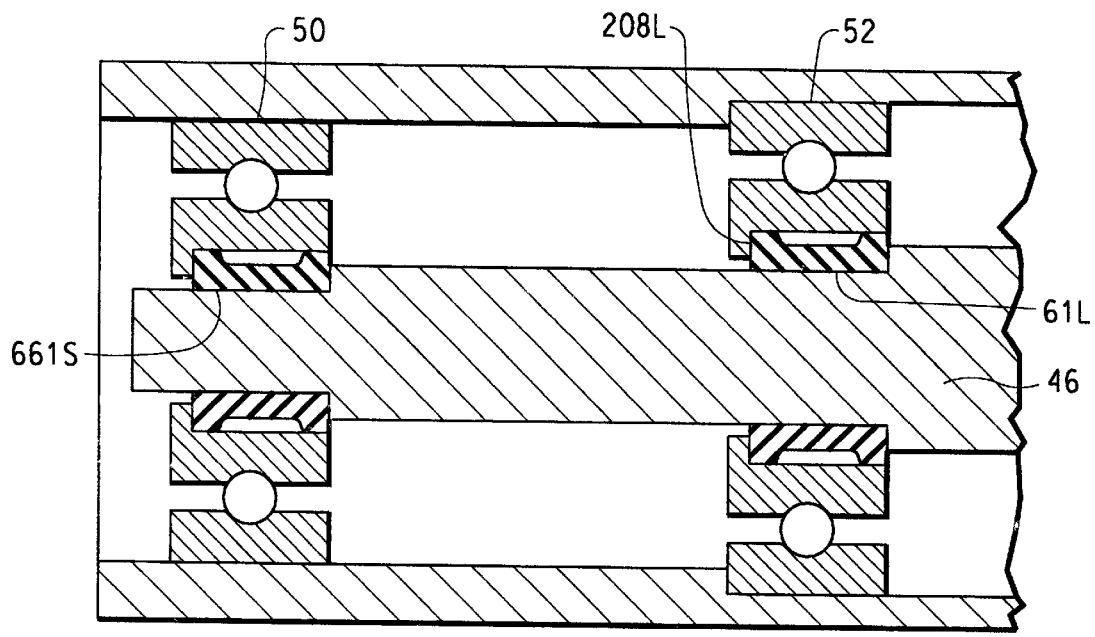
FIG. 13B shows the embodiment of FIG. 13A applied to the chuck example of FIG. 2.

FIG. 13B shows the embodiment of FIG. 13A applied to the chuck example of FIG. 2. Notice that the assembly can be easily achieved by providing a small diameter bearing at the front support bearing 50 and a large diameter bearing at the rear support bearing 52. The support surfaces on the shaft 46 would be similarly smaller and larger diameters to accommodate a small diameter elastomeric member 61S and a large diameter elastomeric member 61L. This allows the step end 208L to fit over the small elastomeric member 61S as the roll with assembled bearings is axially placed over shaft 46 from left to right at assembly of the chuck.

In recapitulation, the present invention utilizes a bearing mount system having a singular elastomeric member therein and a method to reduce excessive vibration in rotating rolls such as chucks.

It is, therefore, apparent that there has been provided in accordance with the present invention, a bearing mount system for reducing vibration of a rotating roll by constraining an elastomeric material in a substantially enclosed area that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed:

1. A mounting system for a rotary bearing having an inner raceway and an outer raceway, each having a mounting surface, used to support a rotating roll on a stationary support member, comprises:

an annular groove adjacent the mounting surface of a raceway on the bearing, the raceway having shoulders on each end of said surface and the groove having a bottom with ends that are substantially aligned with the shoulders of the raceway and a land defining the top of the groove, with the land radially spaced from the raceway by a predetermined radial gap;

a substantially enclosed cross-sectional area when the raceway mounting surface is concentric with the groove, the enclosed area defined by the groove bottom on one side, said raceway surface on an opposed side, and the groove ends, with the extension of the groove ends intersecting the raceway surface or an extension thereof at said gap, on the end sides;

a singular annular member comprising an elastomer, the singular member mounted in the groove and contacting the bottom of the groove and the surface of the raceway, the singular member having a cross-sectional area that is contained within said enclosed cross-sectional area; and an open area within said enclosed cross-sectional area that is free of singular member elastomer, the open area being 15% to 100% of a gap area comprising the product of the distance between the groove ends and the gap, so that when there is relative movement to reduce the distance between the surface of the raceway and the groove land which deflects the singular member elastomer and reduces the enclosed area, the open area is reduced or eliminated and the singular member elastomer viscoelastically deforms so that the mounting system provides a first rate of stiffness during the initial movement and a second rate of stiffness as the movement continues and before the radial deflection exceeds the radial gap, the second stiffness greater than the first stiffness.

2. The mounting system of claim 1, wherein the singular annular member comprises a first raised annular region opposite a second raised annular region, having a recessed annular region therebetween.

3. The mounting system of claim 1, wherein
the raceway of the bearing adjacent the groove is the outer raceway and the groove is contained in the rotating roll.

4. The mounting system of claim 1, wherein
the raceway of the bearing adjacent the groove is the inner raceway and the support member contains the groove.

5. The mounting system of claim 1, wherein
the gap area is 20% to 50% of the enclosed area.

6. The mounting system of claim 1, wherein the groove ends are substantially aligned with the shoulders of the raceway at a spacing wider than the bearing shoulders by a distance less than the gap.

7. The mounting system of claim 1, wherein the singular member has a durometer between 25 and 50 on the Shore A scale.

8. The mounting system of claim 1, wherein the elastomer is selected from the group of materials consisting of natural rubbers, polyurethanes, urethanes, nitrites, silicones, neoprenes, ethylene-propylene rubbers, synthetic rubbers and fluorocarbon elastomers.

9. The mounting system of claim 1, wherein the elastomer of the singular annular member defines open space therein.

10. A method for reducing the vibration of a rotating roll supported by a rotary bearing on a stationary support member, the bearing having an inner raceway and an outer raceway, each having a mounting surface, comprising:
aligning a mounting surface of a raceway on the bearing adjacent an annular groove, the raceway having shoulders on each end of said surface and the groove having a bottom with ends that are substantially aligned with the shoulders of the raceway and a land defining the top of the groove, with the land radially spaced from the raceway by a predetermined radial gap;
arranging the bearing surface concentric with the groove to define a substantially enclosed cross-sectional area, the enclosed area defined by the groove bottom on one side, said raceway surface on an opposed side, and the groove ends, with the extension of the groove ends intersecting the raceway surface or an extension thereof at said gap, on the end sides;
partially filling the enclosed cross-sectional area with an elastomer material that contacts the bottom of the groove and said raceway surface;
providing an open area within said enclosed cross-sectional area that is free of elastomer, the open area being less than or equal to a gap area comprising the product of the distance between the groove ends and the gap;
resisting initial relative movement to reduce the distance between the surface of the raceway and the groove land by viscoelastic deformation of the elastomer material at least partially into the open area providing a first stiffness for reducing vibration, and resisting said relative movement during subsequent movement, before closing the radial gap, by viscoelastic deformation of the elastomer providing a second stiffness for reducing vibration, the second stiffness greater than the first stiffness.

11. The method of claim 10, wherein aligning a mounting surface of a raceway on the bearing adjacent an annular groove comprises aligning the outer raceway of the bearing adjacent the groove contained in the rotating roll.

12. The method of claim 10, wherein aligning a mounting surface of a raceway on the bearing adjacent an annular groove comprises aligning the inner raceway of the bearing adjacent the groove contained in the support member.

13. A mounting system for a rotary bearing having an inner raceway and an outer raceway, used to support a rotating roll on a stationary support member, comprises:
an annular groove, contained in a raceway on the bearing, adjacent a load bearing surface, the annular groove having a bottom with ends opposite one another, the ends being inside a structurally effective width of the raceway, and the groove having a land defining the top of the groove with the land radially spaced from the load bearing surface by a predetermined radial gap;
a substantially enclosed cross-sectional area when the bearing surface is concentric with the groove, the enclosed area defined by the groove bottom on one side, said load bearing surface on an opposed side, and the groove ends, with the extension of the groove ends intersecting the load bearing surface at said gap, on the end sides;
a singular annular member comprising an elastomer, the singular member mounted in the groove and contacting the bottom of the groove and the load bearing surface, the singular member having a cross-sectional area that is contained within said enclosed cross-sectional area; and
an open area within said enclosed cross-sectional area that is free of the elastomer of the singular member, the open area being 15% to 100% of a gap area comprising the product of the distance between the groove ends and the gap, so that when the load bearing surface and the land move relatively toward one another deflecting the singular member elastomer and reducing the enclosed area, the open area is reduced or eliminated and the singular member elastomer viscoelastically deforms so that the mounting system provides a first rate of stiffness during the initial deflection and a second rate of stiffness as the deflection continues and before the radial deflection exceeds the radial gap, the second stiffness greater than the first stiffness.

14. The mounting system of claim 13, wherein the singular annular member comprises a first raised annular region opposite a second raised annular region, having a recessed annular region therebetween.

15. The mounting system of claim 13, wherein the raceway of the bearing is the outer raceway and the load bearing surface is a rotating roll having a surface thereon.

16. The mounting system of claim 13, wherein the raceway of the bearing is the inner raceway and the load bearing surface is a stationary support member having a surface thereon.

17. The mounting system of claim 13, wherein the singular annular member has a durometer between 25 and 50 on a Shore A scale.

18. The mounting system of claim 13, wherein the elastomer is selected from the group of materials consisting of natural rubbers, polyurethanes, urethanes, nitrites, silicones, neoprenes, ethylene-propylene rubbers, synthetic rubbers and fluorocarbon elastomers.

19. The mounting system of claim 13, wherein the elastomer of the singular annular member defines open space therein.

20. A method for reducing the vibration of a rotating roll supported by a rotary bearing on a stationary support member, the bearing having an inner raceway and an outer raceway, comprising:

aligning an annular groove, contained in a raceway on the bearing, adjacent a load bearing surface, the annular groove having a bottom with ends opposite one another, the ends being inside a structurally effective width of the raceway and a land defining the top of the groove with the land radially spaced from the load bearing surface by a predetermined radial gap;

arranging the annular groove concentric with the load bearing surface to define a substantially enclosed cross-sectional area, the enclosed area defined by the groove bottom on one side, said load bearing surface on an opposed side, and the groove ends, with the extension of the groove ends intersecting the load bearing surface at said gap, on the end sides;

partially filling the enclosed cross-sectional area with an elastomer material that contacts the bottom of the groove and said load bearing surface;

providing an open area within said enclosed cross-sectional area that is free of elastomer, the open area being less than or equal to a gap area comprising the product of the distance between the groove ends and the gap;

resisting initial relative movement to reduce the distance between the groove land and the load bearing surface by viscoelastic deformation of the elastomer material at least partially into the open area providing a first stiffness for reducing vibration, and resisting said relative movement during subsequent movement, before closing the radial gap, by viscoelastic deformation of the elastomer providing a second stiffness for reducing vibration, the second stiffness greater than the first stiffness.

21. The method of claim 20, wherein aligning an annular groove, contained in a raceway on the bearing, adjacent a load bearing surface comprises aligning an annular groove contained in the outer raceway adjacent a load bearing surface contained on a rotating roll.

22. The method of claim 20, wherein aligning an annular groove, contained in a raceway on the bearing, adjacent a load bearing surface comprises aligning an annular groove contained in the inner raceway adjacent a load bearing surface contained on a stationary support member.

23. A mounting system for a rotary bearing having an inner raceway and an outer raceway, each having a mounting surface, used to support a rotating roll on a stationary support member, comprises:

a predetermined radial gap spacing apart a raceway mounting surface and an adjacent support surface when the raceway mounting surface is concentric with the support surface;

a substantially enclosed cross-sectional area having a top and bottom defined by features on the raceway mounting surface and the adjacent support surface thereby defining an enclosed area depth, the enclosed area having a width and the enclosed area including the radial gap;

a singular annular member comprising an elastomer, the singular member mounted in the enclosed area and contacting the bottom and top of the enclosed area, the singular member having a cross-sectional area that is contained within said enclosed cross-sectional area; and an open area within said enclosed cross-sectional area that is free of the elastomer of the singular member, wherein the feature on the raceway mounting surface is a step having an end surface and the feature on the support surface is a step having an end surface with the distance between the step end surface on the raceway mounting surface and the step end surface on the support surface defining the enclosed area width.

24. The mounting system of claim 23, wherein the raceway of the bearing adjacent the support surface is the outer raceway and the support surface is contained in the rotating roll.

25. The mounting system of claim 23, wherein the raceway of the bearing adjacent the support surface is the inner raceway and the support surface is contained in the stationary support member.

26. A mounting system for a rotary bearing having an inner raceway and an outer raceway, each having a mounting surface, used to support a rotating roll on a stationary support member, comprises:

a predetermined radial gap spacing apart a raceway mounting surface and an adjacent support surface when the raceway mounting surface is concentric with the support surface;

a substantially enclosed cross-sectional area having a top and bottom defined by features on the raceway mounting surface and the adjacent support surface thereby defining an enclosed area depth, the enclosed area having a width and the enclosed area including the radial gap;

a singular annular member comprising an elastomer, the singular member mounted in the enclosed area and contacting the bottom and top of the enclosed area, the singular member having a cross-sectional area that is contained within said enclosed cross-sectional area; and an open area within said enclosed cross-sectional area that is free of the elastomer of the singular member, wherein the feature on the raceway mounting surface is a groove having a width and the feature on the support surface is a groove having a width with at least one of said features defining the enclosed area width.

27. The mounting system of claim 26, wherein the raceway of the bearing adjacent the support surface is the outer raceway and the support surface is contained in the rotating roll.

28. The mounting system of claim 26, wherein the raceway of the bearing adjacent the support surface is the inner raceway and the support surface is contained in the stationary support member.

29. A mounting system for a rotary bearing having an inner raceway and an outer raceway, each having a mounting surface, used to support a rotating roll on a stationary support member, comprises:

a predetermined radial gap spacing apart a raceway mounting surface and an adjacent support surface when the raceway mounting surface is concentric with the support surface;

a substantially enclosed cross-sectional area having a top and bottom defined by features on the raceway mounting surface and the adjacent support surface thereby defining an enclosed area depth, the enclosed area having a width and the enclosed area including the radial gap;

a singular annular member comprising an elastomer, the singular member mounted in the enclosed area and contacting the bottom and top of the enclosed area, the singular member having a cross-sectional area that is contained within said enclosed cross-sectional area; and an open area within said enclosed cross-sectional area that is free of the elastomer of the singular member, wherein the feature on the raceway mounting surface is a groove having a width equal to the enclosed area width and the feature on the support surface is a surface parallel to the axis of rotation of the bearing.

30. The mounting system of claim 29, wherein the raceway of the bearing adjacent the support surface is the outer raceway and the support surface is contained in the rotating roll.

31. The mounting system of claim 29, wherein the raceway of the bearing adjacent the support surface is the inner raceway and the support surface is contained in the stationary support member.

32. A mounting system for a rotary bearing having an inner raceway and an outer raceway, each having a mounting surface, used to support a rotating roll on a stationary support member, comprises:

a predetermined radial gap spacing apart a raceway mounting surface and an adjacent support surface when the raceway mounting surface is concentric with the support surface;

a substantially enclosed cross-sectional area having a top and bottom defined by features on the raceway mounting surface and the adjacent support surface thereby defining an enclosed area depth, the enclosed area having a width and the enclosed area including the radial gap;

a singular annular member comprising an elastomer, the singular member mounted in the enclosed area and contacting the bottom and top of the enclosed area, the singular member having a cross-sectional area that is contained within said enclosed cross-sectional area; and an open area within said enclosed cross-sectional area that is free of the elastomer of the singular member, wherein the feature on the raceway mounting surface is a surface parallel to the axis of rotation of the bearing and the feature on the support surface is a groove having a width defining the enclosed area width, and wherein the raceway of the bearing adjacent the support surface is the inner raceway and the support surface is contained in the stationary support member.

33. A mounting system for a rotary bearing having an inner raceway and an outer raceway, each having a mounting surface, used to support a rotating roll on a stationary support member, comprises:

a predetermined radial gap spacing apart a raceway mounting surface and an adjacent support surface when the raceway mounting surface is concentric with the support surface;

a substantially enclosed cross-sectional area having a top and bottom defined by features on the raceway mounting surface and the adjacent support surface thereby defining an enclosed area depth, the enclosed area having a width and the enclosed area including the radial gap;

a singular annular member comprising an elastomer, the singular member mounted in the enclosed area and contacting the bottom and top of the enclosed area, the singular member having a cross-sectional area that is contained within said enclosed cross-sectional area; and an open area within said enclosed cross-sectional area that is free of the elastomer of the singular member, the mounting system further comprising a width for the gap that equals the enclosed area width such that a gap area is defined comprising the product of the radial gap and the gap width and the open area is 15% to 100% of the gap area so that when there is relative radial movement to reduce the distance between the raceway mounting surface and the support surface which deflects the singular member elastomer and reduces the enclosed area, the open area is reduced or eliminated and the singular member elastomer viscoelastically deforms so that the mounting system provides a first rate of stiffness during the initial movement and a second rate of stiffness as the movement continues and before the relative movement exceeds the radial gap, the second stiffness being greater than the first stiffness.

34. A method for reducing the vibration of a rotating roll supported by a rotary bearing on a stationary support member, the bearing having an inner raceway and an outer raceway, each having a mounting surface, comprising:

arranging a predetermined radial gap spacing apart a raceway mounting surface and an adjacent support surface when the raceway mounting surface is concentric with the support surface;

providing a substantially enclosed cross-sectional area having a top and bottom defined by features on the raceway mounting surface and the adjacent support surface thereby defining an enclosed area depth, the enclosed area having a width and the enclosed area including the radial gap;

mounting a singular annular member comprising an elastomer in the enclosed area and contacting the bottom and top of the enclosed area, the singular member having a cross-sectional area that is contained within said enclosed cross-sectional area;

providing an open area within said enclosed cross-sectional area that is free of the elastomer of the singular member; and resisting initial relative movement to reduce the distance between the raceway mounting surface and the support surface by viscoelastic deformation of the elastomer material at least partially into the open area providing a first stiffness for reducing vibration, and resisting said relative movement during subsequent movement, before closing the radial gap, by viscoelastic deformation of the elastomer providing a second stiffness for reducing vibration, the second stiffness greater than the first stiffness.

35. The method of claim 34, wherein aligning a mounting surface of a raceway on the bearing adjacent an annular groove comprises aligning the outer raceway of the bearing adjacent the groove contained in the rotating roll.

36. The method of claim 34, wherein aligning a mounting surface of a raceway on the bearing adjacent an annular groove comprises aligning the inner raceway of the bearing adjacent the groove contained in the support member.

* * * * *